(12) United States Patent
Tanabe et al.

(10) Patent No.: US 6,851,639 B2
(45) Date of Patent: Feb. 8, 2005

(54) TAPE MEDIUM RUNNING DEVICE

(75) Inventors: Naohisa Tanabe, Osaka (JP); Kenjiro Nakamura, Osaka (JP)

(73) Assignee: Matsushita Electric Industrial Co., Ltd. (JP)

( * ) Notice: Subject to any disclaimer, the term of this patent is extended or adjusted under 35 U.S.C. 154(b) by 58 days.

(21) Appl. No.: 10/377,103

(22) Filed: Mar. 3, 2003

(65) Prior Publication Data

US 2004/0079825 A1 Apr. 29, 2004

(30) Foreign Application Priority Data

Mar. 5, 2002 (JP) ........................................ 2002-058219

(51) Int. Cl.[7] .............................................. G11B 15/46
(52) U.S. Cl. .................................................... 242/334
(58) Field of Search .......................... 242/333.6, 333.7, 242/334, 334.1, 334.5, 413, 413.1, 413.2, 413.9, 419.2, 421.2, 357, 412.1, 412.2; 360/71

(56) References Cited

U.S. PATENT DOCUMENTS

| 4,553,182 | A | * | 11/1985 | Narita | ........................ 242/357 |
|---|---|---|---|---|---|
| 5,330,118 | A | * | 7/1994 | Yoshikawa | ................ 242/334.5 |
| 5,400,980 | A | * | 3/1995 | Yoshikawa | ................... 242/334 |
| 5,600,504 | A | * | 2/1997 | Seo | ........................ 242/333.7 |
| 5,808,824 | A | * | 9/1998 | Kaniwa et al. | ............. 242/334 |
| 6,079,652 | A | * | 6/2000 | Akitaya | ................... 242/333.6 |
| 6,193,183 | B1 | * | 2/2001 | Yoshizawa | .................... 360/71 |

* cited by examiner

Primary Examiner—William A. Rivera
(74) Attorney, Agent, or Firm—Parkhurst & Wendel, L.L.P.

(57) ABSTRACT

A tape medium running device which can more correctly detect erroneous detection of a winding diameter, prevent an approach from being made to the end of the magnetic recording tape at high running speed and causing a damage on the tape, and can shorten fast forwarding/rewinding time. In this device, a winding diameter change detecting unit detects a change in winding diameter, and a ratio of a detected change in diameter and a maximum value of changes in winding diameter having been detected previously is compared with a predetermined winding diameter change comparison reference to detect abnormality. Thus, it is possible to prevent any approach from being made to the end of the magnetic recording tape at a high running speed based on an erroneous detection to causing a damage on the tape, and to shorten time for fast forwarding and rewinding.

6 Claims, 11 Drawing Sheets

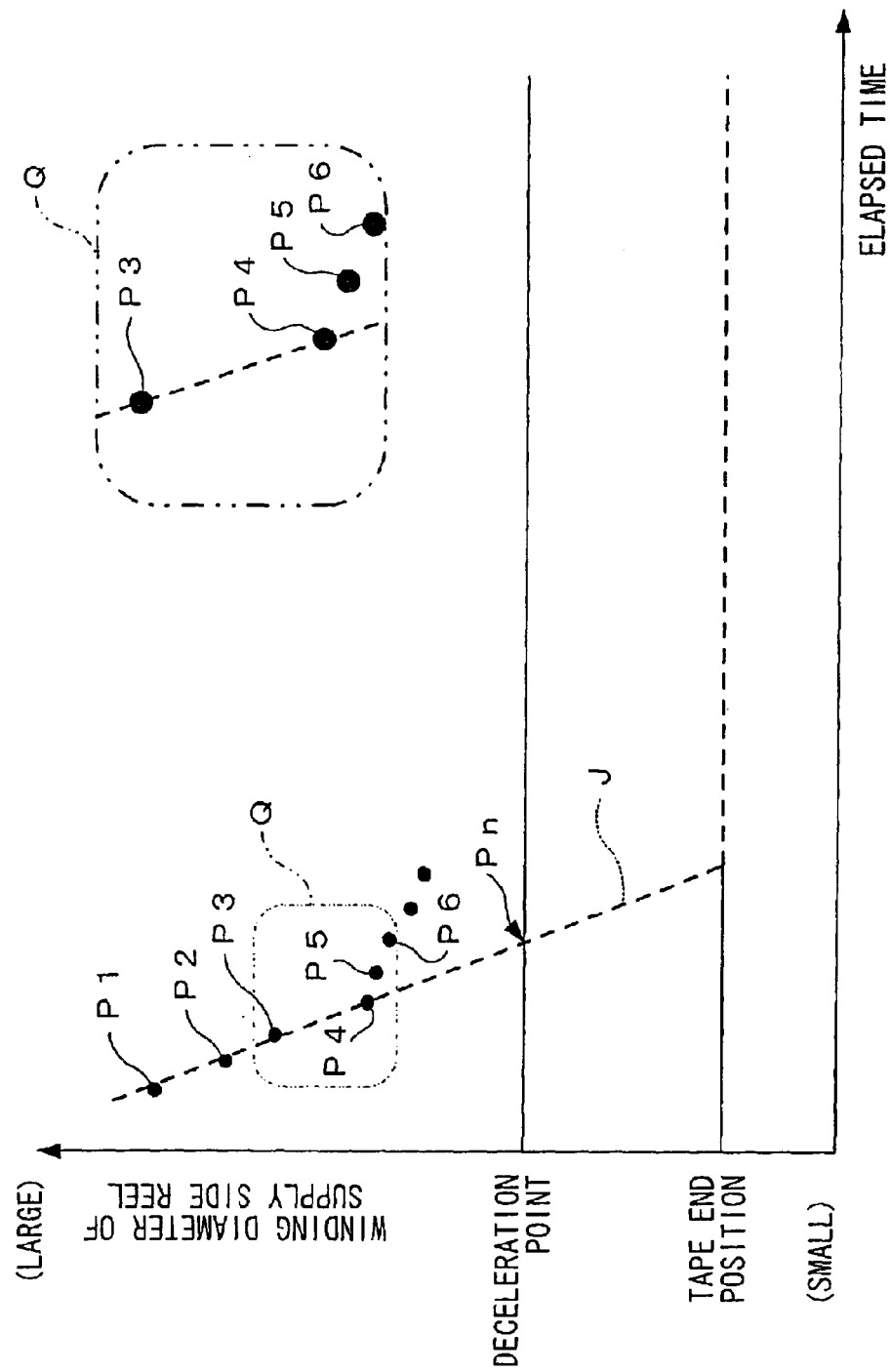

TAPE MEDIUM RUNNING DEVICE

FIELD OF THE INVENTION

The present invention relates to a tape medium running device for performing high-speed running that is installed in a magnetic recording/reproducing apparatus such as a cassette video tape recorder using a magnetic recording medium in the form of a tape.

BACKGROUND OF THE INVENTION

In recent years, following the growth of disks having an advantageous access speed as recording/reproducing mediums, it has been demanded to increase the winding speed of a tape and shorten fast forwarding/rewinding time to improve usability, by increasing the rotation speed of a motor of a magnetic recording tape which has a disadvantageous access speed.

As a tape medium running device, devices disclosed in Japanese Unexamined Patent Publication No. 2000-215559 and so on have been known. FIG. 10 shows a conventional tape medium running device.

Reference numeral 1 denotes a motor for driving a tape, reference numeral 2 denotes a take-up side reel where one end (beginning or end) of a magnetic recording tape is wound. The rotation of the motor 1 is conveyed to belts and gears and causes the magnetic recording tape to run. Reference numeral 3 denotes a supply side reel where the other end (beginning or end) of the magnetic recording tape is wound. The rotation of the take-up side reel 2 causes the magnetic recording tape to run and the magnetic recording tape is supplied to the take-up side reel 2.

Reference numeral 4 denotes a rotation detecting unit having an MR element (magnetic resistance element) which detects polarity (north pole and south pole) provided at predetermined intervals around the motor 1 and outputs a frequency signal, and the MR element outputs a signal of a frequency proportionate to the rotation speed of the motor 1. Reference numeral 5 denotes a winding diameter detecting unit which repeatedly calculates winding diameters based on the number of revolutions of the take-up side reel 2 and the supply side reel 3 and outputs a signal proportionate to a winding diameter.

Reference numeral 6 denotes a high reference speed calculating unit which outputs a high reference speed for setting the rotation speed of the motor 1 at a first speed for winding up the magnetic recording tape at high speed.

Reference numeral 7 denotes a low reference speed calculating unit which outputs a low reference speed for gradually reducing the rotation speed of the motor 1 from the first speed with passage of time and finally setting the rotation speed at a second speed for making stop at the end of the magnetic recording tape.

Reference numeral 8 denotes a winding diameter comparing unit which compares an output from the winding diameter detecting unit 5 and a winding diameter comparison reference value previously set in the unit, and outputs the results.

Reference numeral 101 denotes an abnormality detecting unit for detecting abnormality based on the output from the winding diameter detecting unit 5 and is constituted by a previous winding diameter detection output storage 35, an abnormal winding diameter judging unit 36, an abnormal winding diameter counter 37, and an abnormal winding diameter number comparing unit 38.

The previous winding diameter detection output storage 35 temporality stores a value just before the output from the winding diameter detecting unit 5 is updated, and outputs the value.

The abnormal winding diameter judging unit 36 compares the output from the winding diameter detecting unit 5 and the output from the previous winding diameter detection output storage 35. When the output from the winding diameter detecting unit 5 is larger than the output from the previous winding diameter detection output storage 35, abnormality is judged and a pulse is outputted.

The abnormal winding diameter counter 37 counts output pulses of the abnormal winding diameter judging unit 36 and outputs the results.

The abnormal winding diameter number comparing unit 38 compares the output from the abnormal winding diameter counter 37 and an upper limit of the number of abnormal winding diameter that is previously set in the unit, and the abnormal winding diameter number comparing unit 38 outputs the comparison results.

The output from the high reference speed calculating unit 6 and the output from the low reference speed calculating unit 7 are inputted to a reference speed setting unit 9 which outputs a signal selected based on the output from the winding diameter comparing unit 8 and an output signal of the abnormal winding diameter number comparing unit 38 that is an output signal of the abnormality detecting unit 101. One of the outputs is selected as a reference speed and is outputted.

The speed control unit 10 controls the speed of the motor 1 via the driving unit 11 and performs control so that the output from the rotation detecting unit 4 is close to a reference speed outputted from the reference speed setting unit 9.

First, when an instruction of winding up the magnetic recording tape from a take-up reel to a supply reel of a tape cassette is inputted to the tape medium running device, the reference speed setting unit 9 at the start of the fast forwarding and rewinding selects the output from the high reference speed calculating unit 6 and outputs the selected output to the speed control unit 10 as a reference speed, and the rotation speed of the motor 1 is controlled so as to wind up the magnetic recording tape at high speed (first speed).

In the case of rewinding, the supply reel of the tape cassette serves as the take-up side reel 2 and the take-up reel of the tape cassette serves as the supply side reel 3. Thus, the take-up side reel 2 winds up the magnetic recording tape from the supply side reel 3 in response to the rotation of the motor 1, and the take-up reel of the tape cassette that serves as the supply side reel 3 during winding decreases in winding diameter with passage of time.

As to the supply side reel 3 decreasing in winding diameter with passage of time, the winding diameter is detected by the winding diameter detecting unit 5 and is compared with the winding diameter comparison reference value in the winding diameter comparing unit 8.

The winding diameter comparison reference value inputted in the winding diameter comparing unit 8 is previously set so as to detect that the magnetic recording tape remaining on the supply side reel 3 comes close to the end. When the output from the winding diameter detecting unit 5 is smaller than the comparison reference value, the winding diameter comparing unit 8 judges that the magnetic recording tape comes close to the end.

During rewinding, at the timing when the winding diameter comparing unit 8 judges that the magnetic recording tape comes close to the end, the reference speed setting unit 9 which has recognized the judgment selects the output from the low reference speed calculating unit 7 so as to output a lower speed (second speed) than the first speed as the reference speed of the motor 1, and outputs the selected output to the speed control unit 10. The rotation speed of the motor 1 is automatically reduced to the lower speed (second speed) at a point before the end of the magnetic recording tape, and the tape is wound up.

The above operation is performed when a winding diameter is normally detected by the winding diameter detecting unit 5. When a winding diameter is erroneously detected by the winding diameter detecting unit 5, abnormality occurs so that an approach is made to the end of the magnetic recording tape without reducing the rotation speed of the motor 1 to the low speed (second speed) at a point before the tape end. In the event of such abnormality, the tape may be cut.

In the conventional art, the following operation is performed by the abnormality detecting unit 101 to avoid the above abnormality.

Namely, the abnormal winding diameter judging unit 36 repeatedly compares the latest winding diameter outputted from the winding diameter detecting unit 5 during rewinding and the previous winding diameter outputted from the winding diameter detection output storage 35. When the latest winding diameter is smaller than the previous winding diameter, it is judged that the winding diameter detecting unit 5 normally detects a winding diameter. Meanwhile, when the latest winding diameter is larger than the previous winding diameter, it is judged that the winding diameter detecting unit 5 detects a winding diameter in an abnormal manner.

Hence, when the winding diameter detecting unit 5 detects a winding diameter in an abnormal manner during rewinding, a pulse is outputted from the abnormal winding diameter judging unit 36 to the abnormal winding diameter counter 37.

In the abnormal winding diameter number comparing unit 38, the number of pulses, which are outputted from the abnormal winding diameter judging unit 36 and are counted by the abnormal winding diameter counter 37, is compared with an upper limit of the number of abnormal winding diameters that is previously set in the unit. When detection is made that the count of the abnormal winding diameter counter 37 is larger than the upper limit of the number of abnormal winding diameters, a signal indicating the malfunction of the winding diameter detecting unit 5 is outputted to the reference speed setting unit 9 by the abnormal winding diameter number comparing unit 38.

The reference speed setting unit 9, which recognizes that the abnormal winding diameter number comparing unit 38 detects the malfunction of the winding diameter detecting unit 5, forcibly reduces the rotation speed of the motor 1 to the lower speed (second speed) than the first speed regardless of an output signal of the winding diameter comparing unit 8, and the tape is wound up.

Although the above explanation discussed an example of rewinding, the similar operations are performed for fast forwarding as well.

The winding diameter comparison reference value, that is, a winding diameter position (hereinafter, referred to as a deceleration point) for starting reduction from the first speed to the second speed is set at a position having a smaller diameter on the supply side reel 3 to reduce a section for running at the second speed, so that time for fast forwarding or rewinding can be further shortened.

However, in the above conventional configuration, in the case where the latest winding diameter detected by the winding diameter detecting unit 5 is smaller than the previous winding diameter despite a fact that a winding diameter is erroneously detected by the winding diameter detecting unit 5, the deceleration point is not detected and the abnormality detecting unit 101 does not detect abnormality. Thus, reduction cannot be performed to the second speed and an approach is made to the end of the magnetic recording tape while the high speed (first speed) is maintained, resulting in a damage on the magnetic recording tape.

FIG. 11 shows a specific example.

As to a winding diameter of the supply side reel 3, FIG. 11 shows a graph of actual values and examples of values detected by the winding diameter detecting unit 5 with passage of time. The vertical axis indicates a winding diameter of the supply side reel 3 and the horizontal axis indicates elapsed time. An actual change in winding diameter is indicated by a broken line J, and winding diameters detected by the winding diameter detecting unit 5 are indicated by P1, P2, P3, P4, P5, P6, . . . . Points P5, P6, . . . , indicate points where winding diameters are erroneously detected due to fluctuations in load during running of the magnetic recording tape. The right side shows an enlarged view of a main part Q around the points.

When a winding diameter is erroneously detected due to fluctuations in load during running of the magnetic recording tape, in the conventional abnormality detecting unit 101, the detected winding diameter P5 is smaller than the previous winding diameter P4 stored in the previous winding diameter detection output storage 35 and is not detected as abnormal. At the winding diameters P5, P6, . . . , when such erroneous detections of winding diameters successively occur until the end of the magnetic recording tape, a deceleration point cannot be correctly detected. Although it is assumed that the high speed (first speed) is switched to the low speed (second speed) at a winding diameter Pn and an approach is made to the end of the magnetic recording tape, the approach is actually made to the end while the running speed of the magnetic record is kept at the high speed (first speed).

The present invention is devised to solve the conventional problem and has as its object the provision of a tape medium running device which can more correctly detect erroneous detection of a winding diameter in the winding diameter detecting unit 5, prevents an approach from being made to the end of the magnetic recording tape at high running speed and causing a damage on the tape, and can shorten fast forwarding/rewinding time.

DISCLOSURE OF THE INVENTION

In order to attain the above object, a tape medium running device of the present invention reduces a winding speed to a second speed according to a winding diameter of a magnetic recording tape wound around a reel at a position near the end of the magnetic recording tape when the magnetic recording tape wound around one reel is wound up to the other reel at a high first speed, the device comprising an abnormality detecting unit for detecting abnormality based on the output from a winding diameter detecting unit for detecting a winding diameter of the magnetic recording tape wound around a supply side reel, the abnormality detecting unit comprising a winding diameter change detecting unit for detecting a change in diameter based on a winding diameter detected by the winding diameter detecting unit, and an abnormal winding diameter change judging unit for judging whether a winding diameter detected by the winding diameter detecting unit is correct or not based on a winding diameter change comparison reference and a change in diameter detected by the winding diameter change detecting unit, and notifying a reference speed setting unit of the occurrence of abnormality.

With this configuration, it is possible to prevent erroneous detection of a winding diameter of the magnetic recording tape from causing the magnetic recording tape from approaching its end in a rush at a high running speed to damage itself. Further, fast forwarding/rewinding time can be shortened.

A tape medium running device of the present invention reduces a winding speed to a second speed according to a winding diameter of a magnetic recording tape wound around a reel at a position near the end of the magnetic recording tape when the magnetic recording tape wound around one reel is wound up to the other reel at a high first speed, the device comprising a motor, a rotation detecting unit for detecting a signal of a frequency proportionate to the rotation speed of the motor, a take-up side reel which is wound with one end of the magnetic recording tape and rotates in synchronization with the rotation of the motor, a supply side reel which is wound with the other end of the magnetic recording tape, a winding diameter detecting unit for detecting a winding diameter of the magnetic recording tape wound around the supply side reel, a high reference speed calculating unit for outputting a reference speed for setting the rotation speed of the motor at the first speed, a low reference speed calculating unit for outputting a reference speed for setting the rotation speed of the motor at the second speed, a winding diameter comparing unit for comparing the output from the winding diameter detecting unit and a winding diameter comparison reference value previously set in the unit, an abnormality detecting unit for detecting abnormality based on the output from the winding diameter detecting unit, a reference speed setting unit for outputting an output from the low reference speed calculating unit as a reference speed when the output from the abnormality detecting unit indicates abnormality or when the output from the winding diameter detecting unit is smaller than the winding diameter comparison reference value, and outputting an output from the high reference speed calculating unit as a reference speed in other cases, a speed control unit for outputting a rotation instruction signal based on the output from the rotation detecting unit and an output from the reference speed setting unit, and a driving unit for rotating the motor in response to the rotation instruction signal, wherein the abnormality detecting unit comprises a winding diameter change detecting unit for detecting a change in winding diameter on a basis of a winding diameter detected by the winding diameter detecting unit, and an abnormal winding diameter change judging unit for judging whether the winding diameter detected by the winding diameter detecting unit is correct or not on a basis of a winding diameter change comparison reference and a change in diameter detected by the winding diameter change detecting unit, and notifying the reference speed setting unit of an occurrence of abnormality.

With this configuration, it is judged whether a winding diameter detected by the winding diameter detecting unit is correct or not based on the winding diameter change comparison reference and the change in diameter detected by the winding diameter change detecting unit, and erroneous detection of the winding diameter can be correctly detected and the following phenomenon can be prevented. Thus, it is possible to prevent a deceleration point from being missed due to erroneous detection of a winding diameter, which causes a rush approach to the end of the magnetic recording tape to be made while keeping a high running speed and damages the tape. Further, the deceleration point can be set at a position having a smaller winding diameter on the supply side reel and it is possible to minimize time when the motor runs at a low speed serving as the second speed, thereby shortening fast forwarding/rewinding time.

Further, the present invention is characterized by comprising a winding diameter change comparison reference optimizing unit for changing the winding diameter change comparison reference according to a winding diameter change maximum value detected by the winding diameter change detecting unit.

With this configuration, the winding diameter change comparison reference is changed according to a winding diameter change maximum value detected by the winding diameter change detecting unit, so that it is possible to reduce fluctuations in sensitivity for detecting abnormality in the abnormal winding diameter change judging unit, the fluctuations being resulted from different thicknesses and lengths of magnetic recording tapes.

Moreover, a current tape position is identified according to a plurality of winding diameter comparison reference values previously set inside and the winding diameter detected by the winding diameter detecting unit so that the abnormality detecting unit and the reference speed setting unit are controlled, and the following sections are switched for each tape position: a section where the reference speed of the motor is set at the first speed without going through the abnormality detecting unit, a section where the reference speed of the motor is set at the first speed after a change in winding diameter is detected and only the maximum value of the winding diameter change is stored, a section where the reference speed of the motor is set at the first speed or the second speed via the abnormality detecting unit, and a section where the reference speed of the motor is set at the second speed without going through the abnormality detecting unit, so that two winding diameter regions are provided, one for detecting abnormality in change in winding diameter and the other for not detecting the abnormality.

With this configuration, a winding diameter region for judgment of a winding diameter detected by the winding diameter detecting unit can be discriminated from a winding diameter region not performing judgment. Even when a winding diameter is erroneously detected, judgment is not performed in a winding diameter region not affecting detection of a deceleration point. Thus, it is possible to prevent fast forwarding/rewinding time from being extended by judgment on a winding diameter region not affecting detection of the deceleration point.

Further, the second speed of the low reference speed calculating unit is set as a reference speed permitting deceleration from the first speed with passage of time and a final stop at the end of the magnetic recording tape.

With this configuration, it is expected that the running of the magnetic recording tape can be completed more safely at the ends during fast forwarding/rewinding.

Besides, instead of changing the winding diameter change comparison reference according to a winding diameter change maximum value, the winding diameter change comparison reference is changed according to another statistic value such as an average value of winding diameters previously detected.

This configuration can also reduce fluctuations in sensitivity for detecting abnormality in the abnormal winding diameter change judging unit, the fluctuations being resulted from different thicknesses and lengths of magnetic recording tapes.

BRIEF DESCRIPTION OF THE DRAWINGS

FIG. 11 is a correlation diagram between winding diameter and elapsed time during fast forwarding/rewinding in the conventional tape medium running device.

DESCRIPTION OF PREFERRED EMBODIMENTS

Referring to FIGS. 1 to 9, the following will discuss embodiments of the present invention.

(Embodiment 1)

Figure 1:
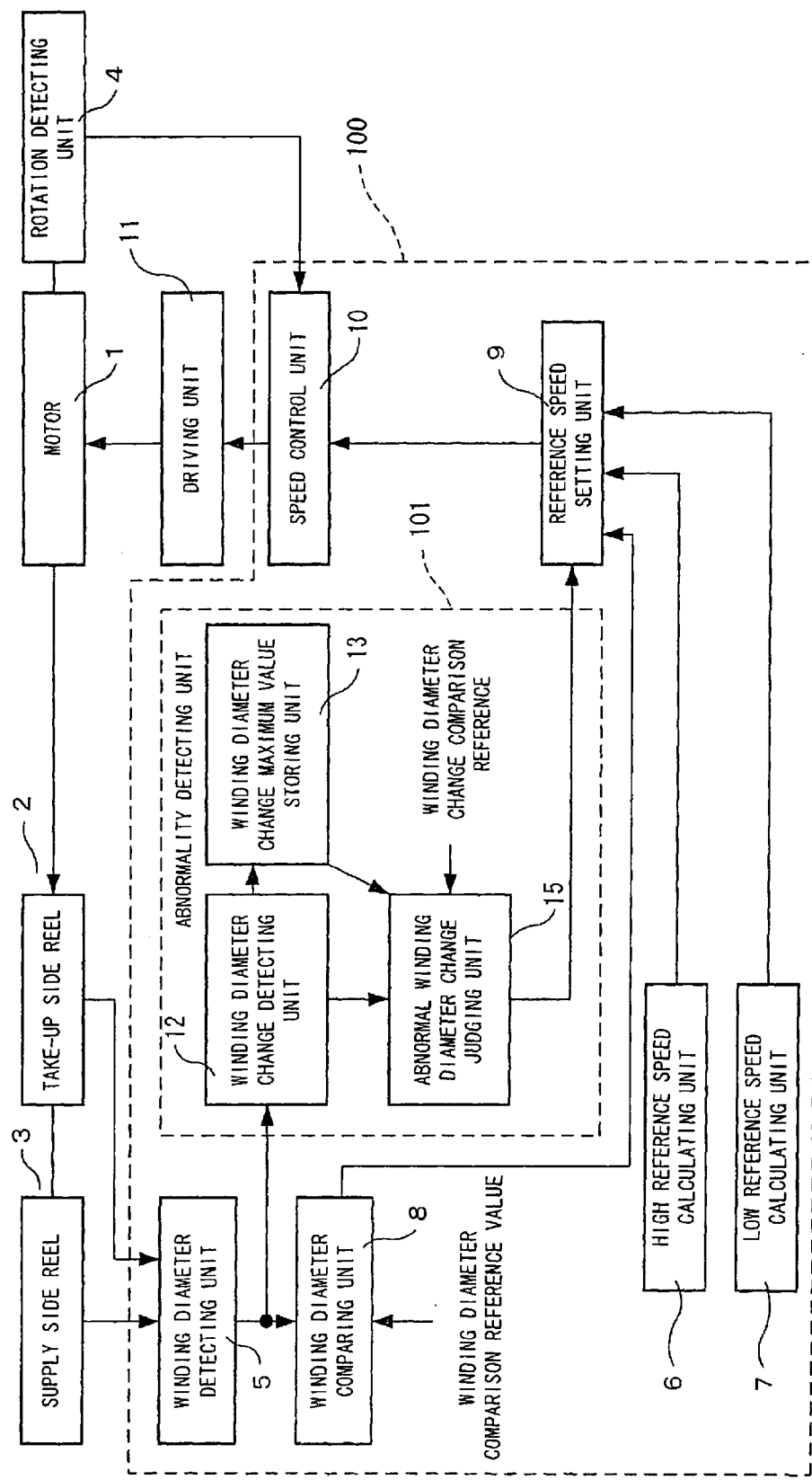
FIG. 1 is a structural diagram showing a tape medium running device according to (Embodiment 1) of the present invention.
Figure 2:
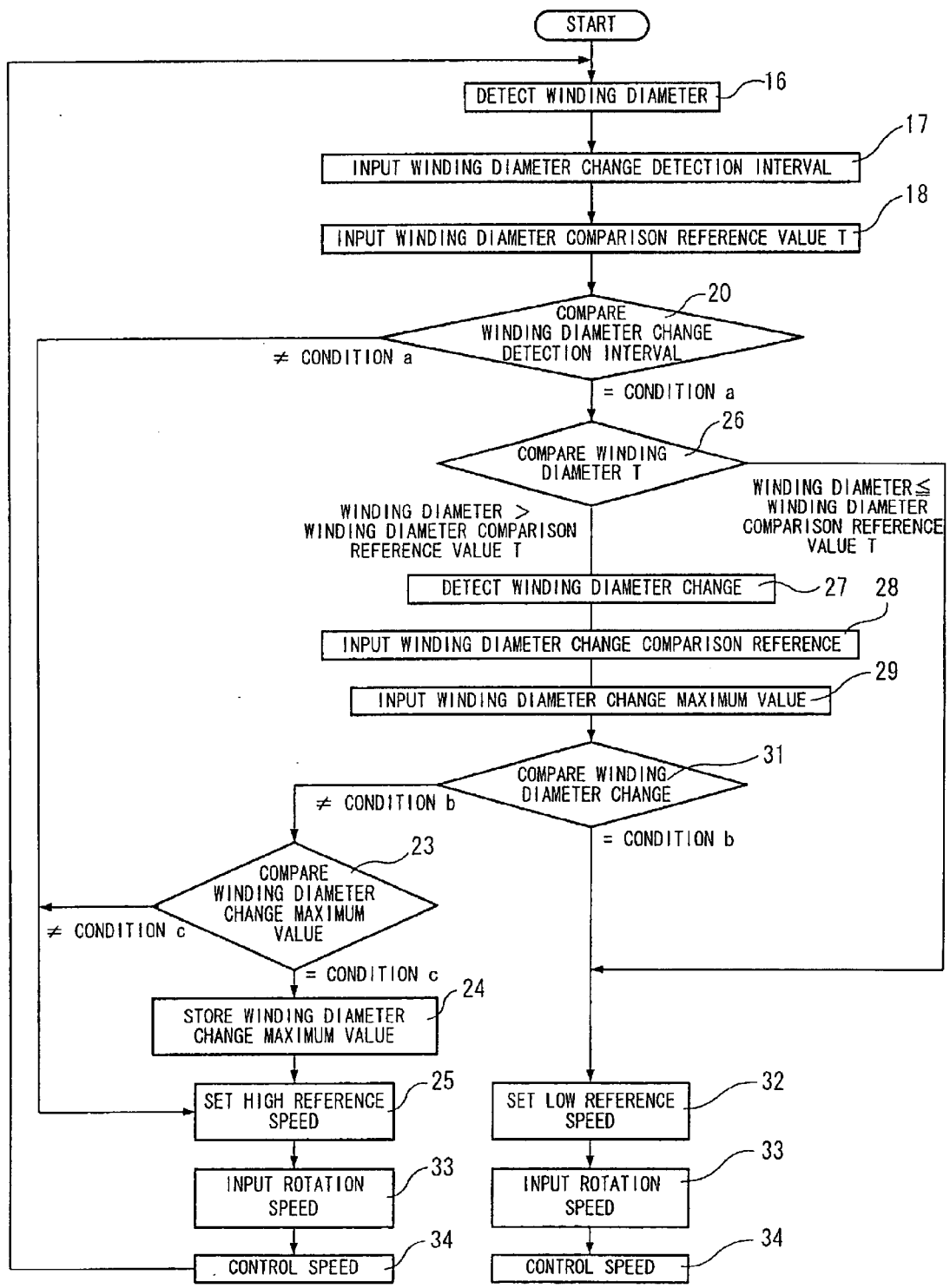
FIG. 2 is a flowchart showing a configuration of an essential part in this embodiment.
Figure 3:
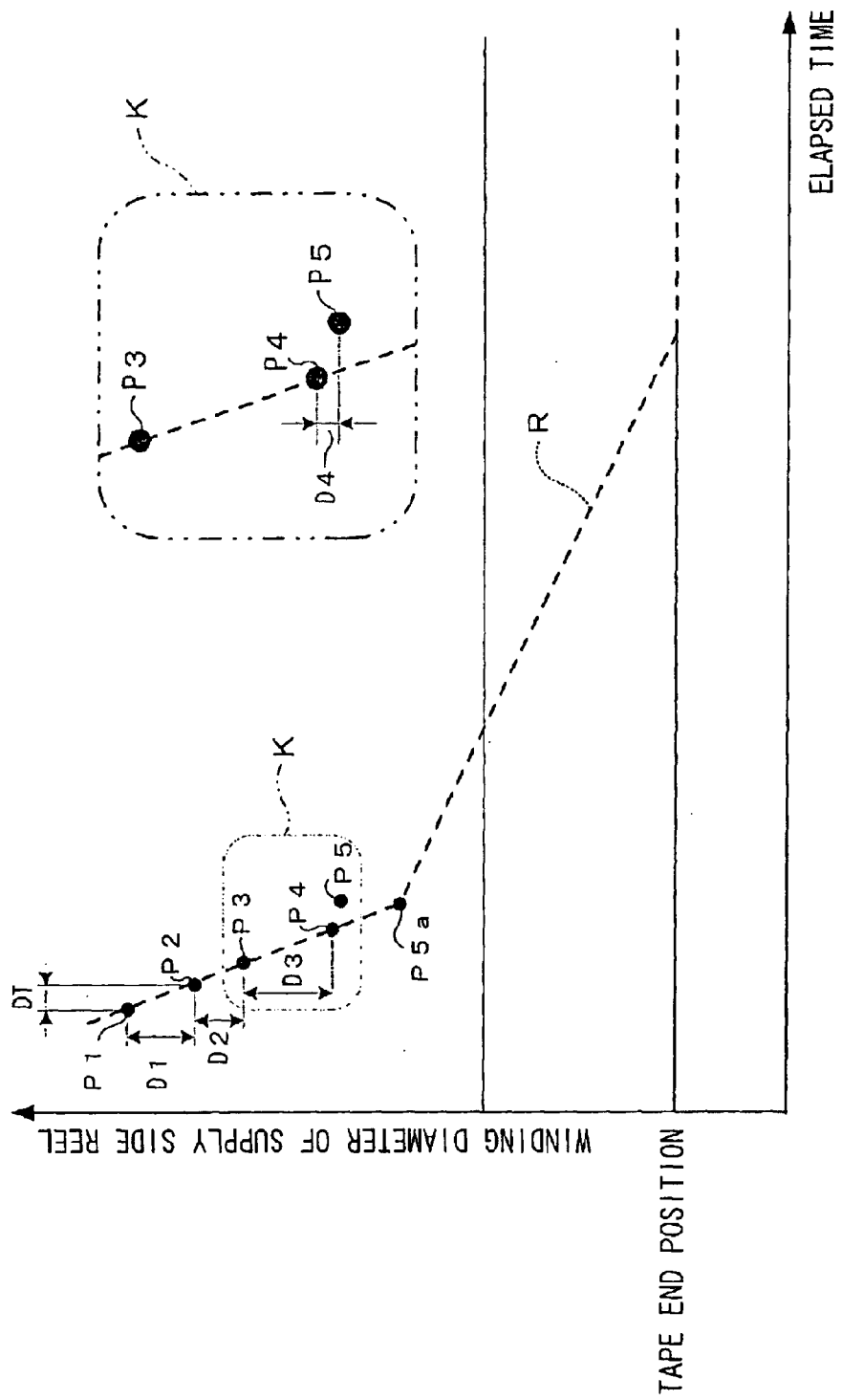
FIG. 3 is a correlation diagram between winding diameter and elapsed time during fast forwarding/rewinding in this embodiment.

FIGS. 1 to 3 show (Embodiment 1) of the present invention.

FIG. 1 shows a tape medium running device according to (Embodiment 1) of the present invention. The same constituent elements as those of the conventional art are indicated by the same reference numerals and the description thereof is omitted.

In FIG. 1, an abnormality detecting unit 101 is constituted by a winding diameter change detecting unit 12, a winding diameter change maximum value storage 13, and an abnormal winding diameter change judging unit 15. In the present embodiment, the functions surrounded by a broken line are realized while a microcomputer 100 serves as a main part.

The winding diameter change detecting unit 12 detects output from a winding diameter detecting unit 5 every unit time that is predetermined in the winding diameter change detecting unit 12, detects a change in winding diameter per unit time, and outputs the change.

The winding diameter change maximum value storage 13 stores and outputs the maximum value of winding diameter changes which have been outputted previously from the winding diameter change detecting unit 12.

The abnormal winding diameter change judging unit 15 judges whether a winding diameter detected by the winding diameter detecting unit 5 is correct or not based on a value outputted from the winding diameter change maximum value storage 13, a value outputted from the winding diameter change detecting unit 12, and a winding diameter change comparison reference which has been inputted in advance. The output from the abnormal winding diameter change judging unit 15 serves as an output signal from the abnormality detecting unit 101 to a reference speed setting unit 9.

FIG. 2 shows the software processing of the microcomputer 100. Referring to FIG. 2, the configuration of the abnormality detecting unit 101 will be described in detail.

The winding diameter detecting unit 5 is realized by a winding diameter detecting step 16 of FIG. 2. A winding diameter comparing unit 8 is realized by a winding diameter T comparing step 26 of FIG. 2. The winding diameter change detecting unit 12 is realized by a winding diameter change detecting step 27 of FIG. 2. The abnormal winding diameter change judging unit 15 is realized by a winding diameter change comparing step 31 of FIG. 2. The winding diameter change maximum value storage 13 is realized by a winding diameter change maximum value comparing step 23 and a winding diameter change maximum value storing step 24 of FIG. 2. A high reference speed calculating unit 6, a low reference speed calculating unit 7, and the reference speed setting unit 9 are realized by a high reference speed setting step 25 of FIG. 2. A speed control unit 10 is realized by a speed controlling step 34 of FIG. 2.

In FIG. 2, reference numeral 16 denotes the winding diameter detecting step of detecting a winding diameter of a magnetic recording tape wound around a supply-side reel 3, reference numeral 17 denotes a winding diameter change detection interval inputting step of inputting a time interval for detecting a change in winding diameter, reference numeral 18 denotes a winding diameter comparison reference value inputting step of inputting a winding diameter comparison reference value T, reference numeral 20 denotes a winding diameter change detection interval comparing step of judging whether elapsed time since detection of the previous change in winding diameter is larger than the time interval inputted in the winding diameter change detection interval inputting step 17, reference numeral 23 denotes the winding diameter change maximum value comparing step of judging whether a winding diameter detected this time is larger than the maximum value of changes in winding diameter that have been detected previously, reference numeral 24 denotes the winding diameter change maximum value storing step of storing a change in winding diameter detected this time as the maximum value of changes in winding diameter, reference numeral 25 denotes the high reference speed setting step of setting a reference speed so that the rotation speed of a motor 1 is equal to a high reference speed serving as a first speed, reference numeral 26 denotes the winding diameter T comparing step of judging whether a winding diameter obtained in the winding diameter detecting step 16 is larger than the winding diameter comparison reference value T inputted in the winding diameter comparison reference value inputting step 18, reference numeral 27 denotes the winding diameter change detecting step of detecting a change in winding diameter, reference numeral 28 denotes a winding diameter change comparison reference inputting step of inputting a winding diameter change reference, reference numeral 29 denotes a winding diameter change maximum value inputting step of inputting the maximum value of changes in winding diameter that have been detected previously, reference numeral 31 denotes the winding diameter change comparing step of judging whether a winding diameter change detected in the winding diameter change detecting step 27 is a normal value or an abnormal value, reference numeral 32 denotes a low reference speed setting step of setting a reference speed so that the rotation speed of the motor 1 is equal to a low reference speed serving as a second speed, reference numeral 33 denotes a rotation speed inputting step of inputting a rotation speed detected by a rotation detecting unit 4, and reference numeral 34 denotes the speed controlling step of outputting an instruction for rotating the motor 1 at the reference speed based on the rotation speed and the reference speed.

Referring to FIGS. 1 and 2, the following will discuss the operation of a tape medium running device configured thus.

First, when an instruction for rewinding a magnetic recording tape from a take-up reel to a supply reel of a tape cassette is inputted to the tape medium running device, the speed control unit 10 activates the motor 1 via a driving unit 11. In the case of rewinding, the supply reel of the tape cassette serves as a take-up side reel 2 and the take-up reel of the tape cassette serves as a supply side reel 3. Thus, due to the rotation of the motor 1, the take-up side reel 2 (the supply reel of the tape cassette), to which the rotation is conveyed, winds up the magnetic recording tape from the supply side reel 3 (the take-up reel of the tape cassette).

When the magnetic recording tape is wound up, in the winding diameter detecting step 16, a winding diameter of the magnetic recording tape wound around the supply side reel 3 is detected according to the time of one rotation of the take-up side reel 2 and the supply side reel 3.

The following will discuss a specific method of calculating a winding diameter in the winding diameter detecting step 16.

When V represents a tape speed calculated by the time of one rotation of the take-up side reel 2 and the time of one rotation of the supply side reel 3, T represents the time of one rotation of the supply side reel 3, and L represents a winding diameter of the magnetic recording tape wound around the supply side reel 3, a length of the magnetic recording tape wound up by one rotation of the reel is calculated by the following equation.

$$V \cdot T \quad (1)$$

At this time, the outer circumference of the reel is calculated by the following equation using the circular constant $\pi$.

$$\pi \cdot L \quad (2)$$

Since the magnetic recording tape is wound up due to the rotation of the take-up side reel 2, equation (1) and equation (2) are equal in length. Therefore, based on the equations, a winding diameter L is calculated by the following equation.

$$L = V \times T / \pi \quad (3)$$

As a method of detecting the rotation of the reel, for example, the following method is available: detection is performed based on judgment whether a slit provided on the reel passes through a position detected by a photosensor. The above description explained the winding diameter calculating method using the time of one rotation of the reel. When A slits are provided on the reel, a winding diameter can be also calculated based on the rotation time of the reel making (1/A) rotation. This method can be similarly performed by using an MR element instead of the photosensor.

In the winding diameter change detection interval inputting step 17, a predetermined time interval of detecting a change in winding diameter is inputted, and in the winding diameter comparison reference value inputting step 18, a predetermined winding diameter comparison reference value T is inputted.

In the winding diameter change detection interval comparing step 20, comparison is made between a detection interval inputted in the winding diameter change detection interval inputting step 17 and elapsed time since detection of the previous change in winding diameter. Additionally, elapsed time since detection of the previous change in winding diameter is detected in the winding diameter change detecting step 27, which will be described later. To be specific, in the winding diameter change detection interval comparing step 20, it is judged whether "condition a" is satisfied or not. "Condition a" is the case where elapsed time since detection of the previous change in winding diameter is larger than an inputted detection interval or the case where no change in winding diameter is detected previously, elapsed time since the first advance is made to the winding diameter change detection interval comparing step 20 is larger than a detection interval inputted in the winding diameter change detection interval inputting step 17. When "condition a" is satisfied (=condition a), the winding diameter comparing step 26 is performed after the winding diameter change detection interval comparing step 20. When "condition a" Is not satisfied (≠condition a) in the winding diameter change detection interval comparing step 20, the high reference speed setting step 25 is subsequently performed.

In the high reference speed setting step 25, a reference is set so that the rotation speed of the motor 1 is equal to the high reference speed set at a high speed (first speed)

In the winding diameter comparing step 26, a winding diameter detected in the winding diameter detecting step 16 and the winding diameter comparison reference value T are compared with each other. When the winding diameter is larger than the winding diameter comparison reference value T, the winding diameter change detecting step 27 is performed. When the winding diameter is not larger than the winding diameter reference comparison value T, the low reference speed setting step 32 is performed.

In the winding diameter change detecting step 27, regarding winding diameters before and after a change, the winding diameters being used for calculation when a change in winding diameter is detected last time, a difference is calculated between the winding diameter after the change and the latest winding diameter detected in the winding diameter detecting step 16, and the difference is outputted as a change in winding diameter.

When no change in winding diameter is detected until the last time, a difference is calculated between the winding diameter at the first advance to the winding diameter change detection interval comparing step 20 and the winding diameter detected this time, and the difference is outputted as a change in winding diameter.

The winding diameter change comparison reference inputting step 28 is performed subsequently to the winding diameter change detecting step 27. In this step, a predetermined winding diameter change comparison reference is inputted. Subsequently, in the winding diameter change maximum value inputting step 29, the winding diameter change maximum value stored in the winding diameter change maximum value storing step 24, which will be described later, is inputted. When the winding diameter change maximum value is not stored, "0" is inputted.

In the winding diameter change comparing step 31 performed subsequently to the winding diameter change maximum value inputting step 29, it is judged whether a value of a change in winding diameter that is detected in the winding diameter change detecting step 27 is a normal value or an abnormal value. As a judging method, it is judged whether the following "condition b" is satisfied or not.

For example, "condition b" includes the following cases: the case where a value is obtained by dividing the winding diameter change maximum value inputted in the winding diameter change maximum value inputting step 29 by a value of a winding diameter change detected in the winding diameter change detecting step 27 and the value is larger than the winding diameter change comparison reference that is predetermined in the winding diameter change comparison reference inputting step 28 or is smaller than "0". When "condition b" is satisfied (=condition b), the low reference speed setting step 32 is performed. In the winding diameter change maximum value inputting step 29, when detection is made that "condition b" is not satisfied (≠condition b), the winding diameter change maximum value comparing step 23 is performed.

In the winding diameter change maximum value comparing step 23, it is judged whether the following "condition c" is satisfied or not.

In "condition c", comparison is made between a change in winding diameter that is detected this time and the winding diameter change maximum value detected previously. At this point, when a change in winding diameter that is detected this time is larger than the winding diameter change maximum value or when the winding diameter change maximum value is not stored and when the winding diameter change maximum value comparing step 23 detects that "condition c" is not satisfied (≠condition c), the high reference speed setting step 25 is performed after the winding diameter change maximum value storing step 24 is skipped. When it is judged that "condition c" is satisfied (=condition c) in the winding diameter change maximum value comparing step 23, the high reference speed setting step 25 is performed after the winding diameter change maximum value storing step 24 is performed.

Besides, in the winding diameter change maximum value storing step 24, a change in winding diameter that is detected this time is stored as the maximum value.

In the above winding diameter change comparing step 31, when detection is made that "condition b" is satisfied (=condition b), the low reference speed setting step 32 is subsequently performed.

In the low reference speed setting step 32, a reference is set so that the rotation speed of the motor 1 is reduced from a high speed (first speed) with passage of time and is finally set at the low reference speed, which is the second speed for making stop at the end of the magnetic recording tape, and the rotation speed inputting step 33 is subsequently performed.

In the rotation speed inputting step 33, the rotation speed of the motor 1 that is detected by the rotation detecting unit 4 is inputted. In the speed controlling step 34, a rotation instruction signal for rotating the motor 1 at the reference speed is outputted based on the rotation speed detected in the rotation detecting step 33 and the reference speed set in the high reference speed setting step 25 or the low reference speed setting step 32. The motor 1 is rotatably driven by the driving unit 11 in response to the rotation instruction signal outputted in the speed controlling step 34.

When the high reference speed setting step 25 is performed to control the rotation of the motor 1 at the high reference speed, the process returns to the winding diameter detecting step 16. When the low reference speed setting step 32 is performed to control the rotation of the motor 1 at the low reference speed, the rewinding of the tape is completed with the speed setting.

The above explanation described an example of rewinding. The similar steps are performed for fast forwarding.

According to the configuration of (Embodiment 1), it is possible to detect erroneous detection of a winding diameter that cannot be detected by a conventional abnormal winding diameter detecting unit of FIG. 11, and to control the rotation speed of the motor 1.

The specific operation will be discussed in accordance with FIG. 3.

Regarding a winding diameter of the supply side reel 3, FIG. 3 is a graph showing an actual value and an example of a value detected by the winding diameter detecting unit 5 with passage of time. The vertical axis indicates a winding diameter of the supply side reel 3, the horizontal axis indicates elapsed time, and a broken line R indicates an actual change in winding diameter. Further, when a change in winding diameter is detected in the winding diameter change detecting step 27 for realizing the winding diameter change detecting unit 12, winding diameters detected in the winding diameter detecting step 16 for realizing the winding diameter detecting unit 5 are indicated by P1, P2, P3, P4, and . . . .

Further, changes in winding diameter that are detected by the winding diameter change detecting unit 12 are indicated by D1 to D4 in the detecting order as follows:

$$D1=P1-P2$$

$$D2=P2-P3$$

$$D3=P3-P4$$

$$D4=P4-P5$$

DT represents an interval of detecting a change in winding diameter and is based on a winding diameter change detection interval (predetermined value) inputted in the winding diameter change detection interval inputting step 17. DT is an equal interval between detection points at the winding diameters P1 to P5.

The right side shows an enlarged view of a main part K around the occurrence of a change in load during running of the magnetic recording tape. Erroneous detection on the winding diameter P5 will be described in detail.

First, before the winding diameter P1 of FIG. 3, the magnetic recording tape is caused to run at high speed from a stopping state, winding diameters are detected at predetermined time intervals, and the speed of the motor 1 is controlled. The specific flow is shown in FIG. 2.

After the passage of the predetermined time, the winding diameter P1 is detected in the winding diameter detecting step 16 as shown in FIG. 3, and the maximum value M is stored in the winding diameter change maximum value storing step 24 as a statistic value of a change in winding diameter that is detected previously.

After the lapse of time DT since the winding diameter P1 is detected in the winding diameter detecting step 16, the winding diameter P2 is detected in the winding diameter detecting step 16, the winding diameter change detection interval DT is inputted in the winding diameter change detection interval inputting step 17, T is inputted in the winding diameter comparison reference value inputting step 18, it is judged that the time DT elapses since the previous winding diameter is detected in the winding diameter change detection interval comparing step 20, and the winding diameter T comparing step 26 is performed.

In the winding diameter T comparing step 26, P2>T is decided and the winding diameter change detecting step 27 is performed. In the winding diameter change detecting step 27, the winding diameter change D1 is detected based on D1=P2−P1, a winding diameter change comparison reference E is inputted in the winding diameter change comparison reference inputting step 28, the winding diameter change maximum value M is inputted in the winding diameter change maximum value inputting step 29, and the values are inputted to the winding diameter change comparing step 31.

M/D1<E is decided in the winding diameter change comparing step 31, and the winding diameter change maximum value comparing step 23 is performed. In the winding diameter change maximum value comparing step 23, M>D1 is decided and the high reference speed setting step 25 is performed.

In the high reference speed setting step 25, a reference is set so that the rotation speed of the motor 1 reaches the high reference speed, the rotation of the motor 1 is controlled, and the process returns to the winding diameter detecting step 16.

Thereafter, the winding diameters P3 and P4 are detected in the similar steps, and the winding diameter changes D2 and D3 are detected in the winding diameter change detecting step 27. In comparison with the maximum value M in step 23, when D2 and D3 are larger than the maximum value M, the maximum value M is updated in step 24 and the process advances to the high reference speed setting step 25. When the maximum value M is larger, the high reference speed setting step 25 is performed while the maximum value M is not changed. Then, the process returns to the winding diameter detecting step 16.

Next, when tension on the tape abruptly increases due to disturbance and the like, since an air layer between tapes wound around the take-up side reel 2 disappears, the rotation speed may temporality increase. In the winding diameter detecting unit 5, a speed V of the magnetic recording tape is calculated according to the rotating speed of the take-up side reel 2. Thus, when the rotation speed increases, a value of the speed V of the magnetic recording tape also increases. When the speed V increases, the winding diameter L obtained by the above equation (3) is calculated as a value larger than an actual winding diameter of the supply side reel 3.

However, in reality, since an air layer between tapes wound around the reel disappears on the take-up side reel 2 when tension abruptly increases on the tape, although the rotation speed temporarily increases, the speed of the tape is not changed. Hence, the supply side reel 3 changes in winding diameter along a broken line of FIG. 3. As illustrated in FIG. 3, although the detection of a winding diameter subsequent to the winding diameter P4 is actually performed around the winding diameter P5a, the winding diameter detecting unit 5 detects the position of the winding diameter P5. Namely, erroneous detection is made that the change in winding diameter is smaller than an actual change in winding diameter.

When it is assumed that erroneous detection of a winding diameter occurs in the winding diameter detecting unit 5 and the winding diameter P5 is detected in the winding diameter detecting step 16, the winding diameter change D4 is detected in the winding diameter change detecting step 27 on the premise that M is stored as the winding diameter change maximum value, and the winding diameter change comparing step 31 is performed.

In the winding diameter change comparing step 31, M/D4 and the winding diameter change comparison reference E are compared with each other. Since the winding diameter D4 is extremely smaller than the maximum value M, M/D4>E is decided, the detection of the winding diameter is recognized as erroneous detection, and the low reference speed setting step 32 is performed.

In the low reference speed setting step 32, a reference is set so that the rotation speed of the motor 1 is equal to the low reference speed, and thus the rotation of the motor 1 slows down.

Next, the following will describe the grounds for setting the winding diameter comparison reference T and the winding diameter change comparison reference value E.

First, when the motor slows down from the position of the winding diameter T, the winding diameter comparison reference T is set at such a winding diameter value that the tape speed can be reduced to a beginning/end arrival speed (low reference speed of the present embodiment) before the magnetic recording tape reaches the end of the tape. Additionally, as to the winding diameter value, a value not being affected by variations (recording time and thickness of the tape) of the tape is obtained by an experiment. For example, in the present embodiment, a winding diameter of the supply side reel 3 is used as the reference winding diameter T at a position where the remaining tape is about 10 meters up to the end.

Next, since the winding diameter change comparison reference E is affected by the detecting sensitivity of erroneous detection of a winding diameter, a value not being considerably affected by detecting sensitivity is obtained by an experiment. For example, when the winding diameter change comparison reference E is set at a small value, "erroneous detection" is judged even when detection of a winding diameter is slightly displaced relative to a change in winding diameter not having erroneous detection of a winding diameter. Hence, a high speed is shifted to a low speed more frequently, resulting in longer fast forwarding/rewinding time. Further, when the winding diameter change comparison reference E is set at a large value, "erroneous detection" is not judged despite a fact that erroneous detection of a winding diameter actually occurs. Thus, a high-speed approach occurs on the end of the tape. A value is obtained by an experiment so that an error in detection of a winding diameter is not detected as erroneous detection of a winding diameter, the error being resulted from fluctuations in detecting sensitivity of a reel sensor and variations of the tape, and the value is set as the winding diameter change comparison reference E. For example, the present embodiment is set so that erroneous detection is judged when detection of a winding diameter has displacement of about 30% relative to a change in winding diameter in a state not having erroneous detection of a winding diameter.

As described above, according to (Embodiment 1), the abnormal winding diameter change judging unit 15 is provided for judging erroneous detection of a winding diameter according to a ratio of a change in winding diameter, so that erroneous detection of a winding diameter can be correctly judged and the following phenomenon can be prevented: a winding diameter is erroneously detected, a deceleration point cannot be detected, and thus an approach is made to the end of the magnetic recording tape while the magnetic recording tape maintains a high running speed.

(Embodiment 2)

Figure 4:
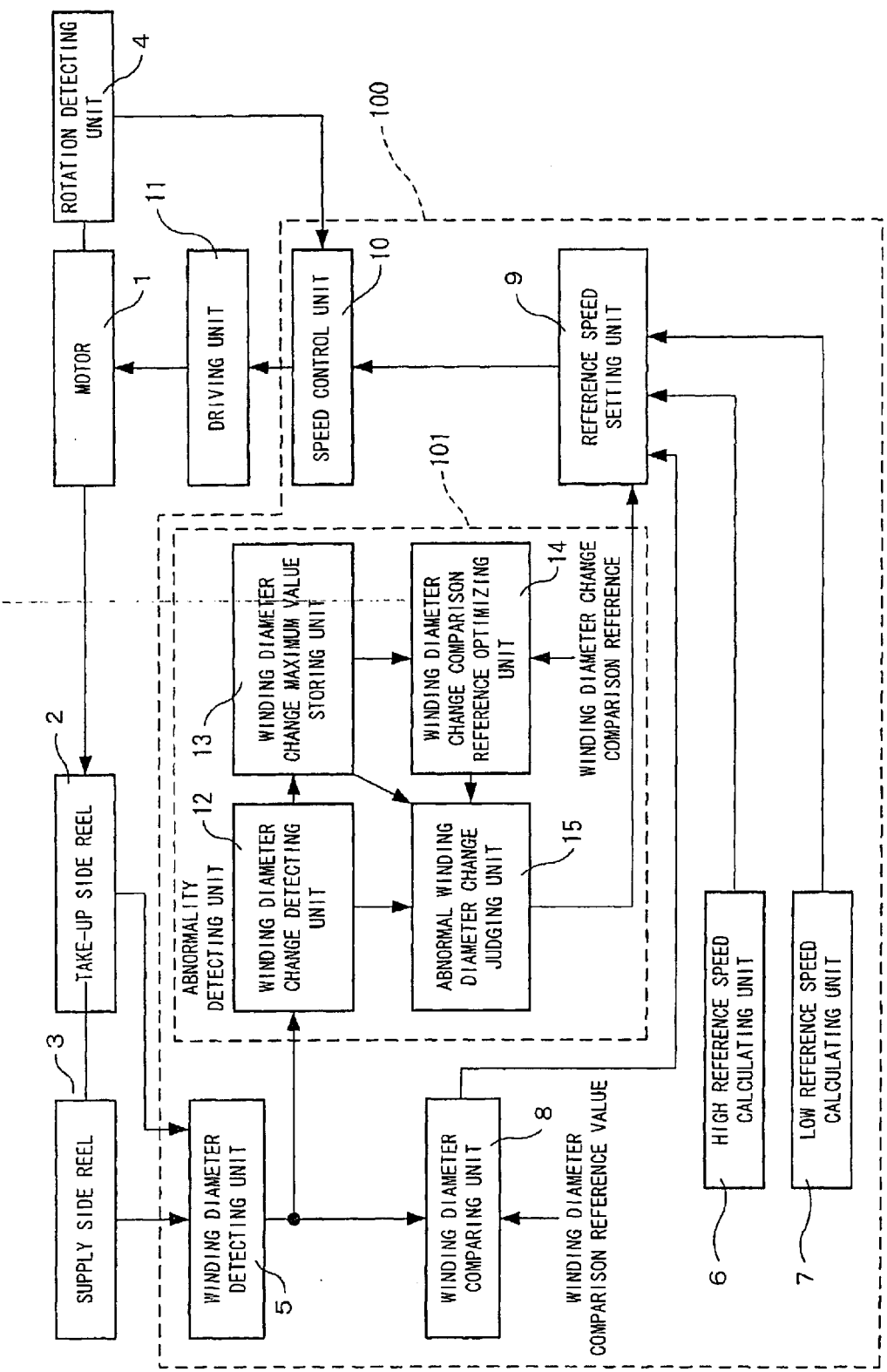
FIG. 4 is a structural diagram showing a tape medium running device according to (Embodiment 2) of the present invention.
Figure 5:
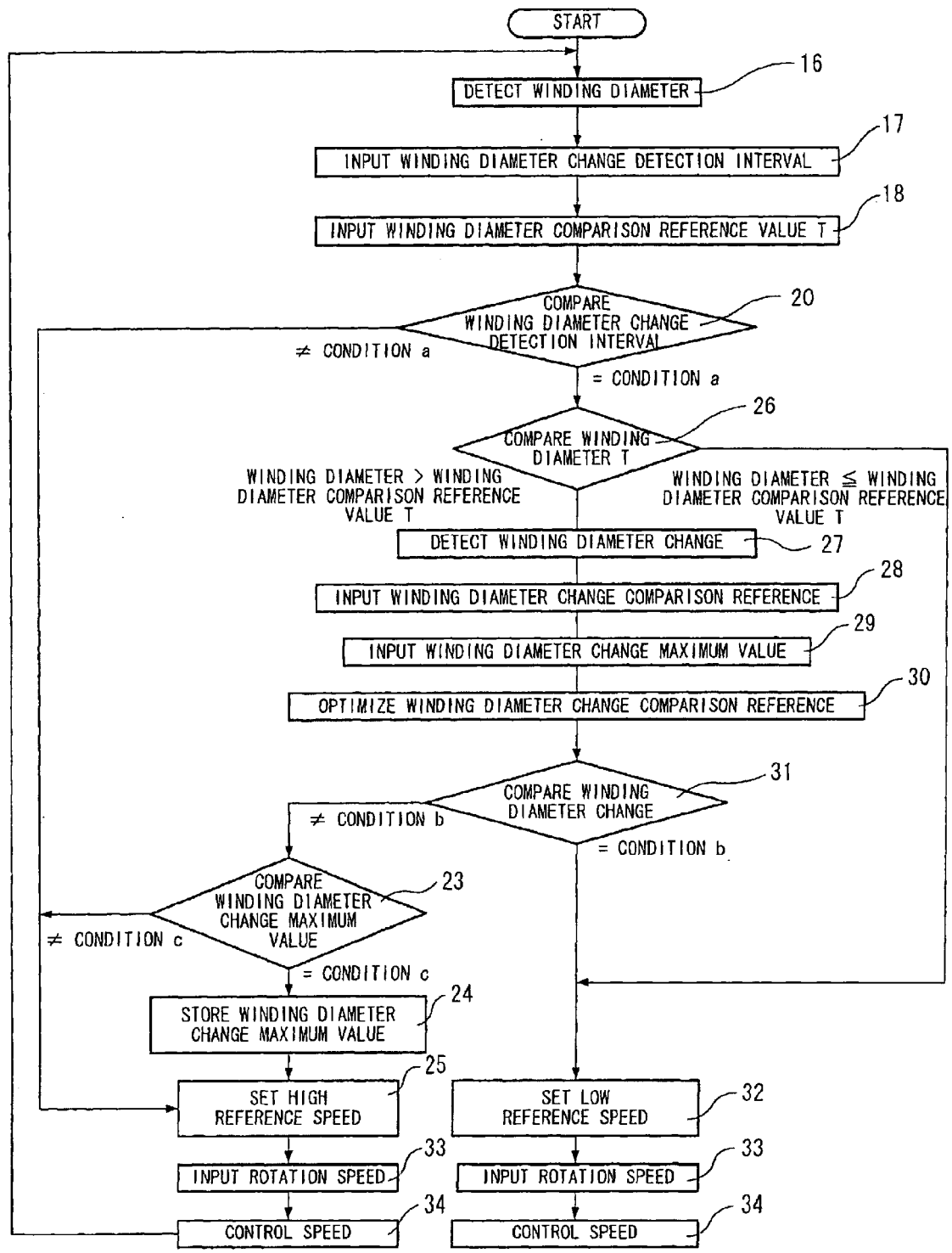
FIG. 5 is a flowchart showing the configuration of an essential part in this embodiment.
Figure 6:
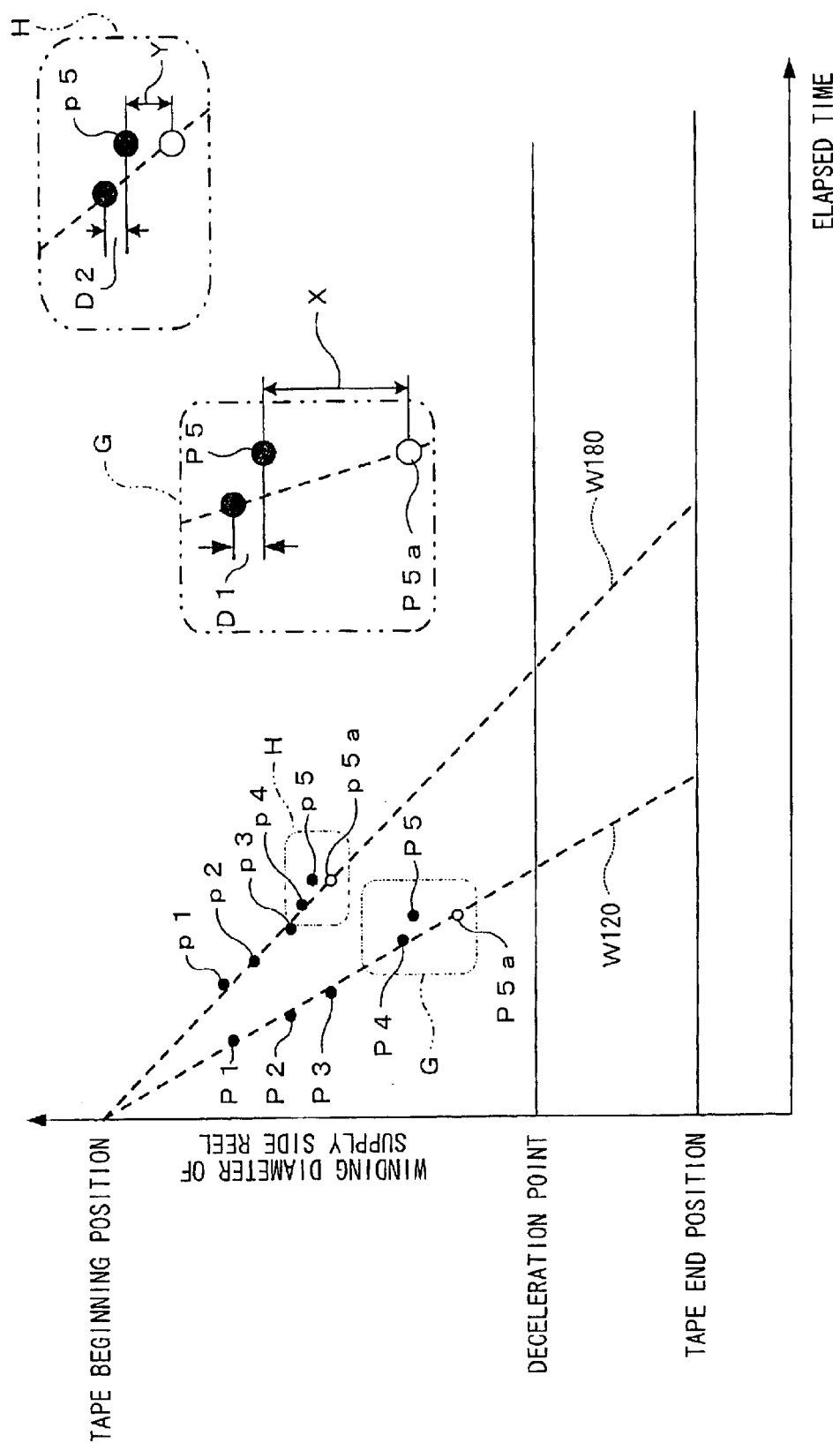
FIG. 6 is a correlation diagram between winding diameter and elapsed time during fast forwarding/rewinding in this embodiment.

FIGS. 4 to 6 show a tape medium running device according to (Embodiment 2) of the present invention. In FIGS. 4 to 6, the same constituent elements as those of the conventional art are indicated by the same reference numerals and the description thereof is omitted.

An abnormal winding diameter change judging unit 15 of (Embodiment 1) judges whether a winding diameter detected by a winding diameter detecting unit 5 is correct or not based on a value outputted from a winding diameter change maximum value storage 13, a value outputted from a winding diameter change detecting unit 12, and a winding diameter change comparison reference which has been inputted in advance, the output from the abnormal winding diameter change judging unit 15 being used as an output signal transmitted from an abnormality detecting unit 101 to a reference speed setting unit 9, and the winding diameter change comparison reference inputted to the abnormal winding diameter change judging unit 15 is constant. In (Embodiment 2), the winding diameter change comparison reference is supplied to an abnormal winding diameter change judging unit 15 from a winding diameter change comparison reference optimizing unit 14. As to the winding diameter change comparison reference optimizing unit 14, (Embodiment 2) is different from (Embodiment 1) only in that the winding diameter change comparison reference optimizing unit 14 is provided for changing the winding diameter change comparison reference, which has been previously set inside the unit, according to a winding diameter change maximum value detected by the winding diameter change detecting unit 12.

To be specific, the winding diameter change comparison reference optimizing unit 14 changes the winding diameter change comparison reference, which has been previously set in the unit, according to an output from the winding diameter change maximum value storage 13, which stores the winding diameter change maximum value detected by the winding diameter change detecting unit 12, and the reference is inputted to the abnormal winding diameter change judging unit 15.

FIG. 5 shows the software processing of a microcomputer 100. Referring to FIG. 5, the configuration of the abnormality detecting unit 101 will be discussed in detail.

Additionally, the winding diameter detecting unit 5 is realized by a winding diameter detecting step 16 of FIG. 5. A winding diameter comparing unit 8 is realized by a winding diameter T comparing step 26 of FIG. 5. The winding diameter change detecting unit 12 is realized by a winding diameter change detecting step 27 of FIG. 5. The winding diameter change comparison reference optimizing unit 14 is realized by a winding diameter change comparison reference optimizing step 30 of FIG. 5. The abnormal winding diameter change judging unit 15 is realized by a winding diameter change comparing step 31 of FIG. 5. The winding diameter change maximum value storage 13 is realized by a winding diameter change maximum value comparing step 23 and a winding diameter change maximum value storing step 24 of FIG. 5. The reference speed setting unit 9 is realized by a high reference speed setting step 25, a high reference speed calculating unit 6, and a low reference speed calculating unit 7 of FIG. 5. A speed control unit 10 is realized by a speed controlling step 34 of FIG. 5.

In FIG. 5, reference numeral 16 denotes the winding diameter detecting step of detecting a winding diameter of the magnetic tape wound around a supply side reel 3, reference numeral 17 denotes a winding diameter change detection interval inputting step of inputting a time interval for detecting a change in winding diameter, reference numeral 18 denotes a winding diameter comparison reference value inputting step for inputting a winding diameter comparison reference value T, reference numeral 20 denotes a winding diameter change detection interval comparing step for judging whether elapsed time since the previous change in winding diameter is detected is longer than the time interval inputted in the winding diameter change detection interval inputting step 17, reference numeral 23 denotes the winding diameter change maximum value comparing step of judging whether a change in winding diameter that is detected this time is larger than the maximum value of changes in winding diameter that have been detected previously, reference numeral 24 denotes the winding diameter change maximum value storing step of storing a change in winding diameter that is detected this time as the winding diameter change maximum value, reference numeral 25 denotes the high reference speed setting step of setting a reference speed so that the rotation speed of the motor 1 is equal to a high reference speed serving as a first speed, reference numeral 26 denotes the winding diameter comparing step of judging whether the winding diameter comparison reference value obtained in the winding diameter detecting step 16 is larger than the winding diameter comparison reference T inputted in the winding diameter comparison reference value inputting step 18, reference numeral 27 denotes the winding diameter T change detecting step of detecting a change in winding diameter, reference numeral 28 denotes a winding diameter change comparison reference inputting step of inputting the winding diameter change reference, reference numeral 29 denotes a winding diameter change maximum value inputting step of inputting the maximum value of changes in winding diameter that have been detected previously, reference numeral 30 denotes the winding diameter change comparison reference optimizing step of changing the winding diameter change comparison reference, which has been inputted in the winding diameter change comparison reference inputting step 28, according to the winding diameter change maximum value inputted in the winding diameter change maximum value inputting step 29, reference numeral 31 denotes the winding diameter change comparing step of judging whether a change in winding diameter that is detected in the winding diameter change detecting step 27 is a normal value or an abnormal value, reference numeral 32 denotes a low reference speed setting step of setting a reference speed so that the rotation speed of the motor 1 is equal to a low reference speed serving as a second speed, reference numeral 33 denotes a rotation speed inputting step of inputting the rotation speed detected by a rotation detecting unit 4, and reference numeral 34 denotes a speed controlling step of outputting a rotation instruction for rotating the motor 1 at the reference speed based on the rotation speed and the reference speed.

Referring to FIGS. 4 and 5, the following will discuss the operation of the tape medium running device configured thus. In the flowchart of (Embodiment 1) shown in FIG. 2, the winding diameter change comparing step 31 is performed subsequently to the winding diameter change maximum value inputting step 29. The flowchart of (Embodiment 2) shown in FIG. 5 is different in that the winding diameter change comparison reference optimizing step 30 is placed between the winding diameter change maximum value inputting step 29 and the winding diameter change comparing step 31.

In the winding diameter change comparison reference optimizing step 30 performed subsequently to the winding diameter change maximum value inputting step 29, the winding diameter change comparison reference inputted in the winding diameter change comparison reference inputting step 28 is changed according to the winding diameter change maximum value inputted in the winding diameter change maximum value inputting step 29. For example, when E represents the winding diameter change comparison reference having been inputted in advance, M represents the winding diameter change maximum value, M0 represents a value serving as a reference of the winding diameter change maximum value M, and N represents the optimized winding diameter change comparison reference, the following calculation is performed to obtain the optimized winding diameter change comparison reference.

$$N = E \times M / M0 \quad (4)$$

In this way, the winding diameter change comparison reference is changed according to the winding diameter change maximum value to prevent the following phenomenon: in the case of a large winding diameter change maximum value, when the winding diameter change comparison reference is too small, even erroneous detection of a winding diameter does not affect detection of a deceleration point, and a change in winding diameter that does not have to be detected as an abnormal change is regarded as abnormal. Namely, this is because the larger the winding diameter change maximum value, the more successfully unnecessary detection of abnormality can be prevented more by increasing the winding diameter change comparison reference to reduce the sensitivity of judging an abnormal change in winding diameter.

Next, in the winding diameter change comparing step 31, it is judged whether a winding diameter change detected in the winding diameter change detecting step 27 is a normal value or an abnormal value. As a judging method, it is judged whether the following "condition b" is satisfied or not.

For example, "condition b" includes the following case: a value is obtained by dividing the winding diameter change maximum value inputted in the winding diameter change maximum value inputting step 29 by a value of a winding diameter change detected in the winding diameter change detecting step 27, and the value is larger than the winding diameter change comparison reference predetermined in the winding diameter change comparison reference optimizing step 30 or is smaller than "0". When "condition b" is satisfied (=condition b) the low reference speed setting step 32 is performed. In the winding diameter change maximum value inputting step 29, when detection is made that "condition b" is not satisfied (≠condition b), the winding diameter change maximum value comparing step 23 is performed.

Parts other than the winding diameter change comparison reference optimizing step 30 and the winding diameter change comparing step 31 are similar to those of (Embodiment 1).

Although the above description discussed an example of rewinding, the similar operations are performed for fast forwarding as well.

According to the configuration of (Embodiment 2), the winding diameter change comparison reference optimizing unit 14 is provided for optimally setting the winding diameter change comparison reference according to the winding diameter change maximum value, so that even when the magnetic recording tape is changed in winding amount and thickness, erroneous detection of a winding diameter can be judged by the proper winding diameter change comparison reference.

Additionally, the "winding amount" and the "thickness of the magnetic recording tape" will be described below.

First, an "amount" of the magnetic recording tape means a length and a "thickness" means a tape thickness. Magnetic recording tapes are different in length and thickness for each kind of tape cassettes (a 120-minute tape, a 180-minute tape, and so on). In the case of a magnetic recording tape having a short recording time (e.g., a 120-minute tape), the tape is short with a large thickness. In the case of a magnetic recording tape having a long recording time (e.g., a 180-minute tape), the tape is long with a small thickness.

In this way, in the case of different kinds of tape cassettes, a change in winding diameter is also varied during fast forwarding/rewinding as shown in FIG. 6. As an example of a kind of tapes, FIG. 6 shows an actual winding diameter change characteristic W120 of a 120-minute tape and an actual winding diameter change characteristic W180 of a 180-minute tape. Since the 120-minute tape is shorter than the 180-minute tape, winding time from the beginning to the end of the tape is shorter and the characteristics of changes in winding diameter are inclined steeply.

First, the following will discuss a rewinding operation of the 120-minute tape.

Rewinding is started from the beginning of the tape, and winding diameter detections P1, P2, P3, P4, P5, . . . , are performed (● in FIG. 6) by the winding diameter detecting unit 5 every fixed period of time, and abnormality is judged based on the above operation. In this case, as shown in an enlarged view of a main part G around the error detection winding diameter P5, a value of D1 satisfies M/D1>E, "abnormality" is judged at the winding diameter P5, and the speed of the tape is reduced to a low speed. With respect to an actual winding diameter, the main part G shows a large difference X between a calculated winding diameter and an actual winding diameter P5a (○ in FIG. 6) at the winding diameter P5, and abnormality actually occurs on detection of a winding diameter. Thus, it is found that the result of abnormality judgment is correct.

On the other hand, in the case of rewinding of a 180-minute tape, winding diameter detections p1, p2, p3, p4, p5, . . . , are performed (● in FIG. 6) by the winding diameter detecting unit 5 every fixed period of time. When abnormality is judged using the above detection of a winding diameter, the abnormality detecting method of the 120-minute tape, and the winding diameter change comparison reference value E, the relationship of M/D2>E is established. As shown in an enlarged view of a main part H around the error detection winding diameter p5, "abnormality" is judged at the winding diameter p5 as in the case of the 120-minute tape. However, as shown in the main part H, a difference Y is small between an actual winding diameter p5a (○ in FIG. 6) at the winding diameter p5 and the detected winding diameter. A detected winding diameter is approximate to an actual winding diameter, "abnormality" is judged in spite of a fact that "abnormality" is not present in reality, and thus the speed of the tape is reduced to a low speed. Therefore, low-speed running periods increase and thus longer time is necessary for winding up the tape.

In (Embodiment 2), the winding diameter change comparison reference value E is changed for magnetic recording tapes which are different in "length" and "thickness". Any kind of tape cassettes inserted into a cassette video recorder can perform fast forwarding/rewinding in a short time.

To be specific, based on the equation (4), N is obtained by optimizing the winding diameter change comparison reference value E according to the winding diameter change maximum value M, and changes in winding diameter are compared with each other based on the winding diameter change comparison reference value (optimized) N. As shown in FIG. 6, the winding diameter change maximum value M is varied (the value is reduced as the recordable time increases) for each kind of tapes. A ratio calculated by dividing the winding diameter change maximum value M by a reference value M0 is multiplied by the winding diameter change comparison reference value E, so that it is possible to calculate the winding diameter change comparison reference value N which is optimized according to the winding diameter change maximum value, or the kind of tape cassettes. Abnormality is judged based on the winding diameter change comparison reference value N calculated thus, so that accuracy of judging abnormality is improved for each kind of tape cassettes and fast forwarding/rewinding can be completed in a short time even when tape cassettes are different in "length" and "thickness".

(Embodiment 3)

Figure 7:
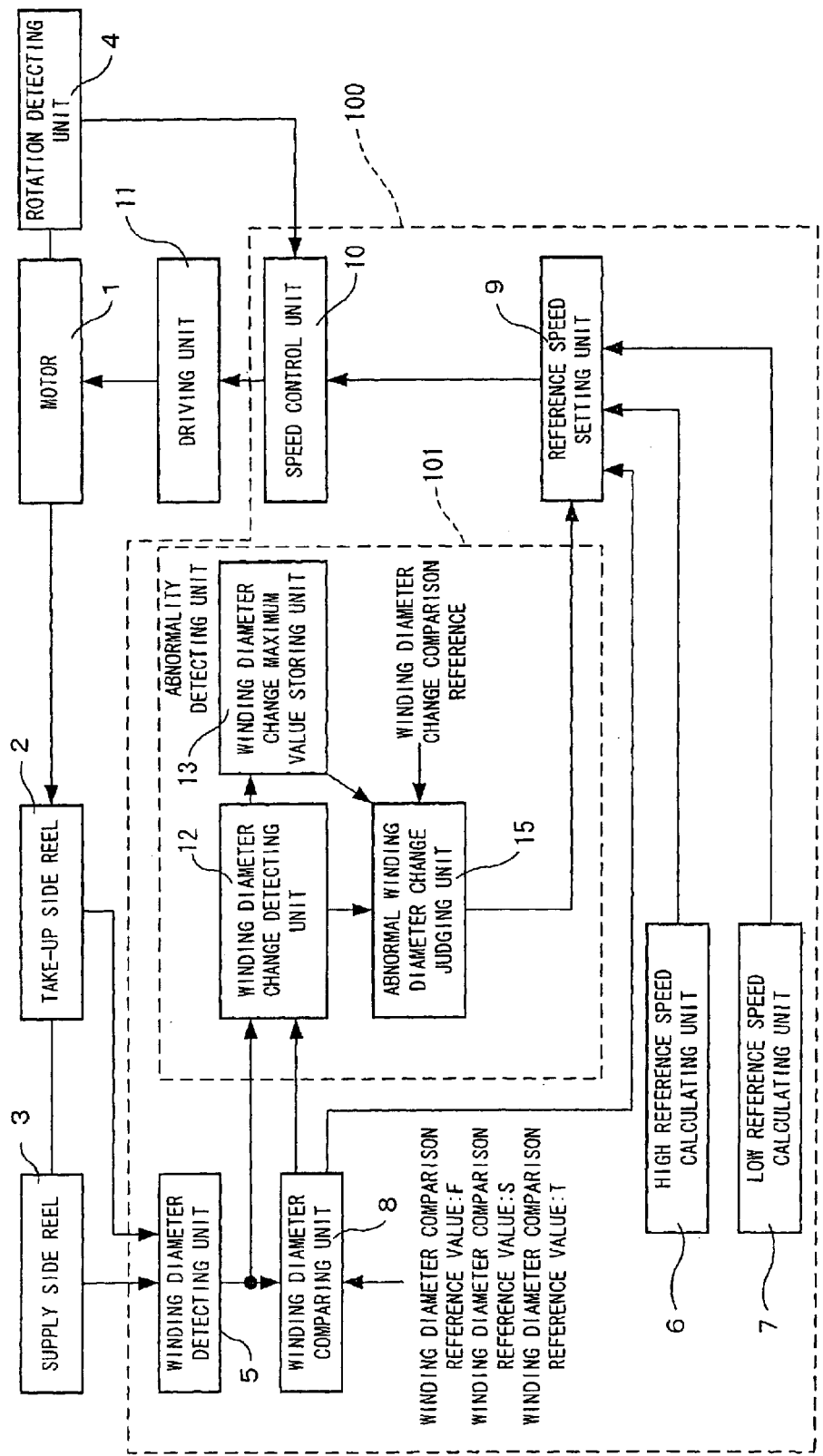
FIG. 7 is a structural diagram showing a tape medium running device according to (Embodiment 3) of the present invention.
Figure 8:
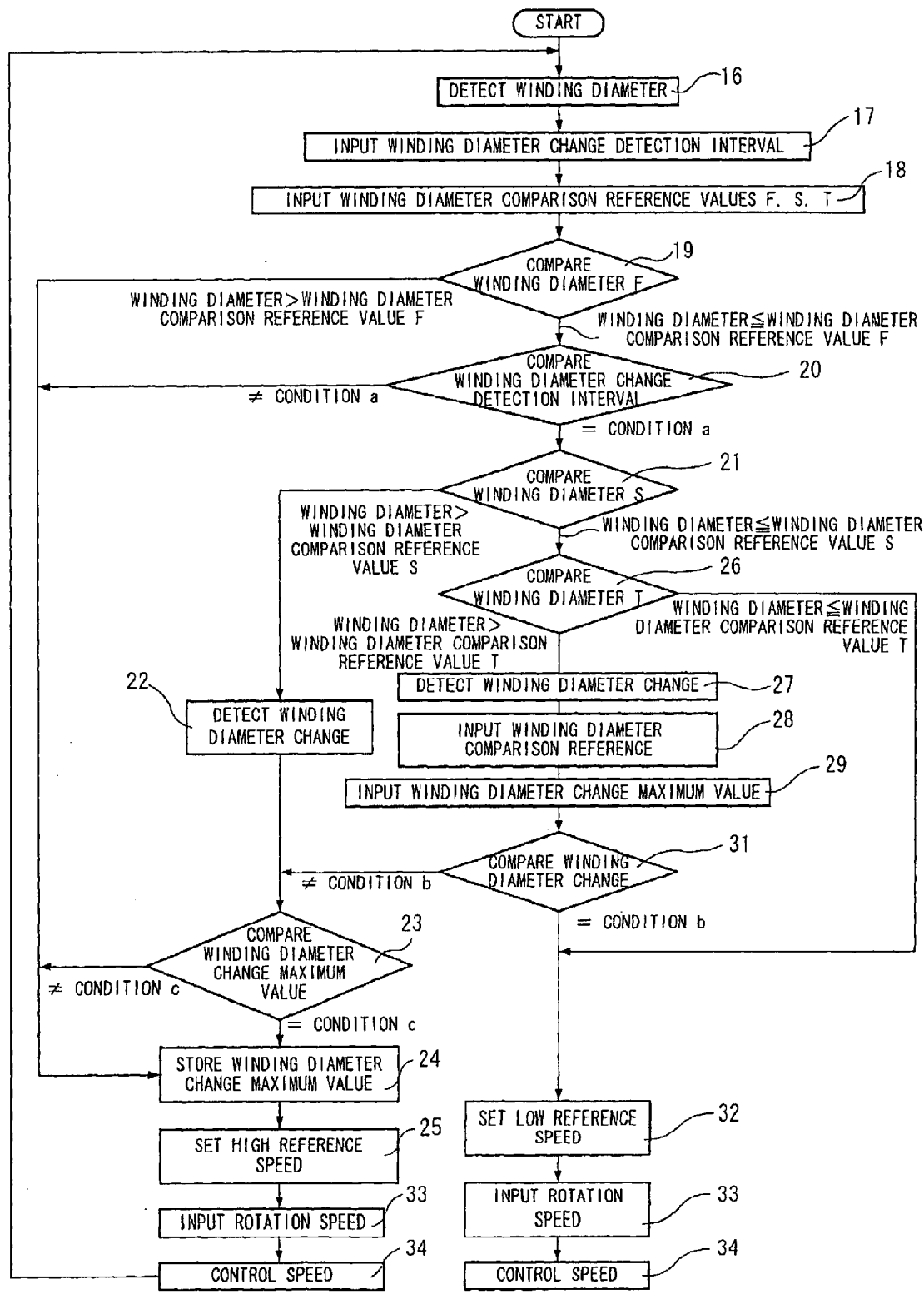
FIG. 8 is a flowchart showing a configuration of an essential part in this embodiment.
Figure 9:
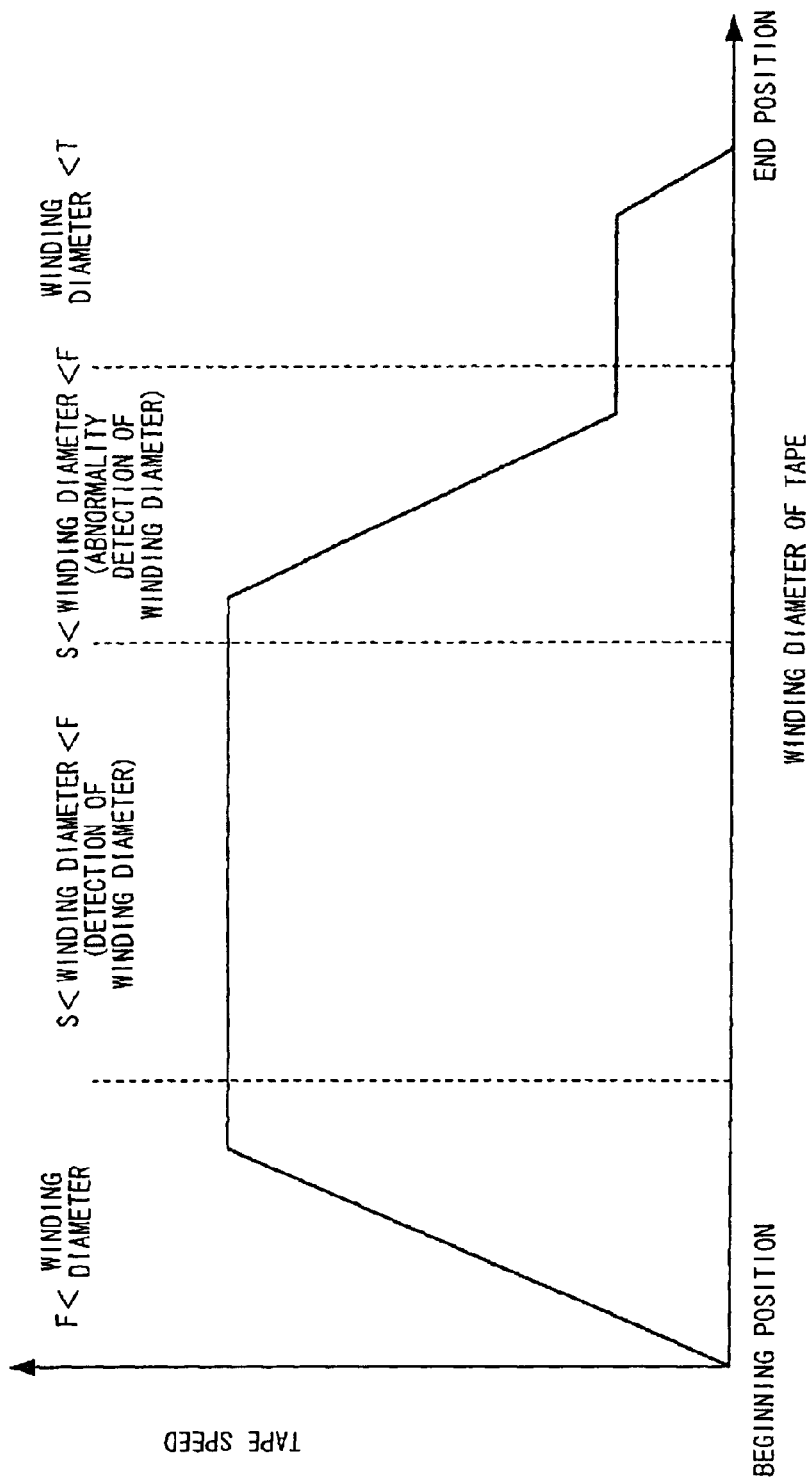
FIG. 9 is a correlation diagram between a winding diameter and a tape speed during fast forwarding/rewinding in this embodiment.
Figure 10:
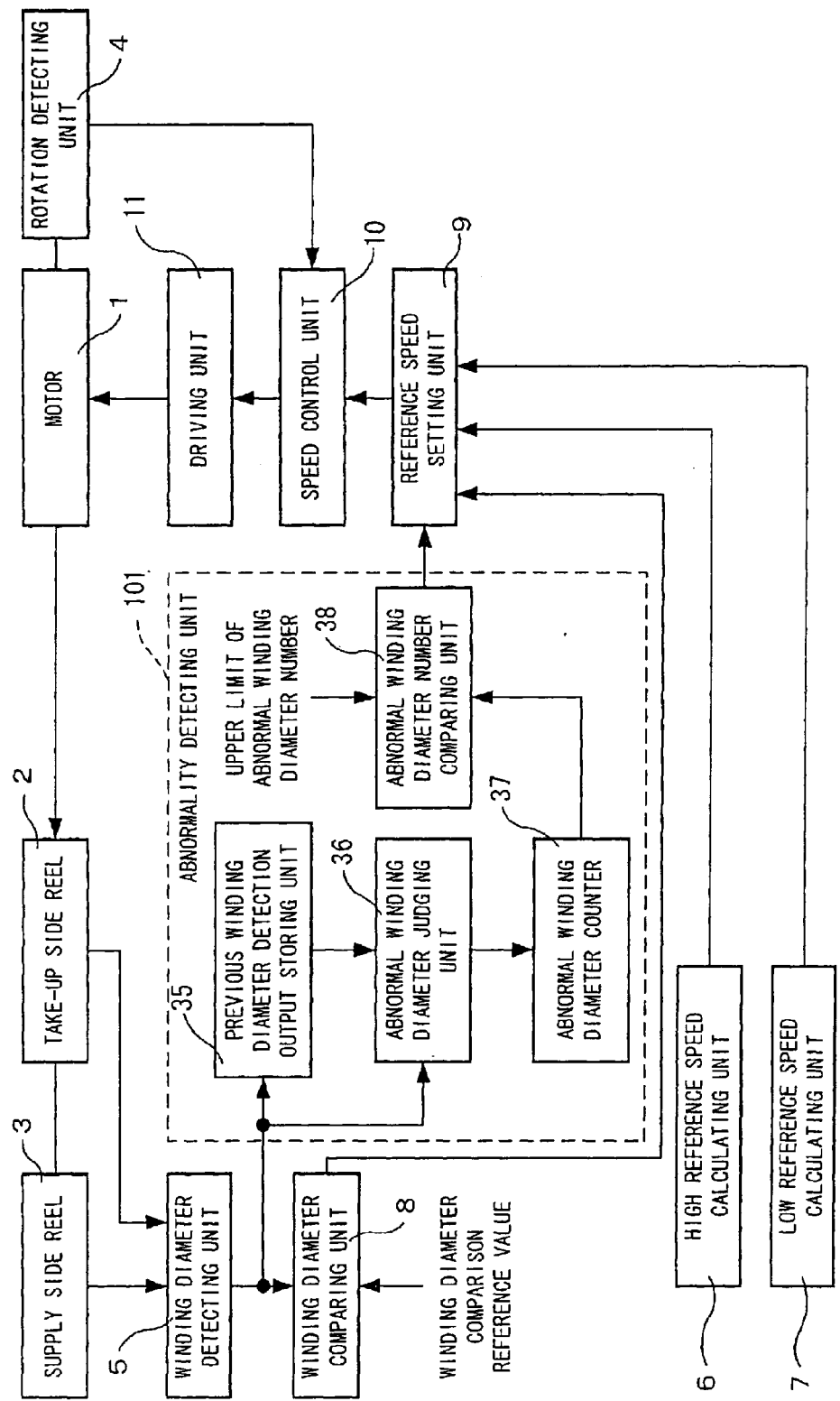
FIG. 10 is a block diagram showing a configuration of a conventional tape medium running device.

FIGS. 7 to 9 show (Embodiment 3) of the present invention.

FIG. 7 shows a tape medium running device according to (Embodiment 3) of the present invention. The same constituent elements as those of the conventional art are indicated by the same reference numerals and the description thereof is omitted.

A single winding diameter comparison reference value is set in the winding diameter comparing unit 8 of (Embodiment 1). On the other hand, in (Embodiment 3), three winding diameter comparison reference values are set and proper one of the three reference values and the output from the winding diameter detecting unit 5 are compared with each other. Further, while a signal is not inputted from a winding diameter comparing unit 8 to a winding change detecting unit 12 of an abnormality detecting unit 101 in (Embodiment 1), (Embodiment 3) is different from (Embodiment 1) only in that a signal is inputted to an abnormality detecting unit 101 from a winding diameter comparing unit 8.

FIG. 8 shows the software processing of the microcomputer 100. Referring to FIG. 8, the configuration of the abnormality detecting unit 101 will be described in detail.

The flowcharts of FIG. 8 and FIG. 2 are different in the following three points:

(1) three winding diameter comparison reference values F, S, and T are inputted in a winding diameter comparison reference value inputting step 18 of FIG. 8,
(2) a winding diameter F comparing step 19 is placed between the winding diameter comparison reference value inputting step 18 and a winding diameter change detection interval comparing step 20, and
(3) a winding diameter S comparing step 21 is placed between the winding diameter change detection interval comparing step 20 and a winding diameter T comparing step 26.

In the winding diameter F comparing step 19, it is judged whether a winding diameter obtained in the winding diameter detecting step 16 is larger than a winding diameter comparison reference value F inputted in the winding diameter comparison reference value inputting step 18. When detection is made that a winding diameter is larger than the winding diameter comparison reference value F (winding diameter>winding diameter comparison reference value F), a high reference speed setting step 25 is performed. In the winding diameter F comparing step 19, when detection is made that a winding diameter is not larger than the winding diameter comparison reference value F (winding diameter≦winding diameter comparison reference value F), the winding diameter change detection interval comparing step 20 is performed.

In the winding diameter change detection interval comparing step 20, it is judged whether elapsed time since a change in winding diameter is detected last time is longer than a time interval inputted in a winding diameter change detection interval inputting step 17. In the winding diameter change detection interval comparing step 20, when detection is made that "condition a" is not satisfied (≠condition a), the high reference speed setting step 25 is performed. In the winding diameter change detection interval comparing step 20, when detection is made that "condition a" is satisfied (=condition a), the winding diameter S comparing step 21 is performed.

In the winding diameter S comparing step 21, it is judged whether the winding diameter obtained in the winding diameter detecting step 16 is larger than the winding diameter comparison reference value S inputted in the winding diameter comparison reference value inputting step 18. In the winding diameter S comparing step 21, when detection is made that a winding diameter is larger than the winding diameter comparison reference value S (winding diameter≧winding diameter comparison reference value S), a winding diameter change detecting step 22 for detecting a winding diameter change is performed and a winding diameter change maximum value comparing step 23 is performed. In the winding diameter S comparing step 21, when detection is made that a winding diameter is not larger than the winding diameter comparison reference value S (winding diameter≦winding diameter comparison reference value S), the winding diameter T comparing step 26 is performed. Others are the same as those of FIG. 2.

Referring to FIGS. 7 and 8, the following will discuss the operation of a tape medium running device configured thus.

First, when an instruction of winding the magnetic recording tape is inputted to the tape medium running device, a speed control unit 10 activates a motor 1 via a driving unit 11. In response to the rotation of the motor 1, a take-up side reel 2 where the rotation is conveyed winds up the magnetic recording tape from a supply side reel 3.

When the magnetic recording tape runs, in the winding diameter detecting step 16, the winding diameter of the magnetic recording tape wound around the supply side reel 3 is detected based on the time of one rotation of the take-up side reel 2 and the supply side reel 3.

In the winding diameter change detection interval inputting step 17, a time interval for detecting a predetermined change in winding diameter is inputted. In the winding diameter comparison reference value inputting step 18, predetermined winding diameters comparison reference values F, S, and T are inputted. Besides, the relationship of F>S>T is established.

In the winding diameter comparing step 19, the winding diameter detected in the winding diameter detecting step 16 and the winding diameter comparison reference value F are compared with each other. When the winding diameter is larger than the winding diameter comparison reference value F, a high reference speed setting step 25 is performed. In the high reference speed setting step 25, a reference is set so that the rotation speed of the motor 1 is equal to a high reference speed serving as a first speed for winding up the magnetic recording tape at high speed. On the other hand, when the winding diameter is not larger than the winding diameter comparison reference value F, the process goes to the winding diameter change detection interval comparing step 20. In the winding diameter change detecting step 22 or the winding diameter change detecting step 27, comparison is made between elapsed time since a change in winding diameter is detected last time and a detection interval inputted in the winding diameter change detection interval inputting step 17. Namely, when elapsed time since a change in winding diameter is detected last time is longer than the inputted detection interval, when a change in winding diameter has not been detected previously, or when elapsed time since the first advance to the winding diameter change detection interval comparing step 20 is longer than the detection interval inputted in the winding diameter change detection interval inputting step 17; the above cases are defined as "condition a" When "condition a" is satisfied (=condition a), the process goes to the winding diameter comparing step 21. When "condition a" is not satisfied (≠condition a), the high reference speed setting step 25 is performed.

Next, in the winding diameter S comparing step 21, a winding diameter detected in the winding diameter detecting step 16 and the winding diameter comparison reference value S are compared with each other. When the winding diameter is larger than the winding diameter comparison reference value S, the process goes to the winding diameter change detecting step 22. When the winding diameter is not larger than the winding diameter comparison reference value S, the winding diameter comparing step 26 is performed.

In the winding diameter change detecting step 22, regarding winding diameters before and after a change, the winding diameters being used for calculation when a change in winding diameter is detected last time, a difference is calculated between the winding diameter after the change and the winding diameter detected in the winding diameter detecting step 16 this time, and the difference is outputted as a change in winding diameter. At this point, when a change in winding diameter has not been detected previously, a difference is calculated between a winding diameter at the first advance to the winding diameter change detection interval comparing step 20 and the winding diameter detected this time, and the difference is outputted as a change in winding diameter. Subsequently, in the winding diameter change maximum value comparing step 23, a winding diameter detected this time and the winding diameter change maximum value previously are compared with each other. At this point, when the winding diameter change detected this time is larger than the winding diameter change maximum value or when the winding diameter change maximum value is not stored, the above conditions are defined as "condition c". When "condition c" is satisfied (=condition c), after the change in winding diameter that is detected this time is stored as the maximum value in the winding diameter change maximum value storing step 24, the process goes to the high reference speed setting step 25. When "condition c" is not satisfied (≠condition c) the high reference speed setting step 25 is directly performed.

In the winding diameter comparing step 26, the winding diameter detected in the winding diameter detecting step 16 and the winding diameter comparison reference value T are compared with each other. When the winding diameter is larger than the winding diameter comparison reference value T, the process goes to the winding diameter change detecting step 27. When the winding diameter is not larger than the winding diameter comparison reference value T, the low reference speed setting step 32 is performed. In the low reference speed setting step 32, a reference is set so that the rotation speed of the motor 1 is reduced from the first speed with the passage of time and is finally set at the low reference speed serving as the second speed for making stop at the end of the magnetic recording tape. In the winding diameter change detecting step 27, regarding the winding diameters before and after a change, the winding diameters being used for calculation when a change in winding diameter is detected last time, a difference is calculated between the winding diameter after the change and the winding diameter detected in the winding diameter detecting step 16 this time, and the difference is outputted.

In the winding diameter change comparison reference inputting step 28, a predetermined winding diameter change comparison reference is inputted. In the winding diameter change maximum value inputting step 29, the winding diameter change maximum value stored in the winding diameter change maximum value storing step 24 is inputted. At this point, when the winding diameter change maximum value is not stored, "0" is inputted.

In the winding diameter change comparing step 31, it is judged whether a change in winding diameter that is detected in the winding diameter change detecting step 27 is a normal value or an abnormal value. As a judging method, for example, the following method is available. When a value obtained by dividing the winding diameter change maximum value inputted in the winding diameter change maximum value inputting step 29 by a value of a change in winding diameter that is detected in the winding diameter change detecting step 27 is larger than the winding diameter change comparison reference predetermined in the winding diameter change comparison reference inputting step 28 or is smaller than "0", this case is defined as "condition b". When "condition b" is satisfied (=condition b), the process goes to the low reference speed setting step 32. When "condition b" is not satisfied (≠condition b), the winding diameter change maximum value comparing step 23 is performed.

Subsequently, in the rotation speed inputting step 33, the rotation speed of the motor 1 is inputted. The rotation speed is detected by the rotation detecting unit 4. In the speed controlling step 34, a rotation instruction signal is outputted for rotating the motor 1 at a reference speed based on the rotation speed detected in the rotation detecting step 33 and the reference speed set in the high reference speed setting step 25 or the low reference speed setting step 32. The motor 1 is rotated by the driving unit 11 in response to the rotation instruction signal outputted in the speed controlling step 34.

Finally, when the rotation of the motor 1 is controlled at the high reference speed, the process returns to the winding diameter detecting step 16. When the rotation of the motor 1 is controlled at the low reference speed, fast forwarding/rewinding is completed with the speed setting.

Additionally, the winding diameter detecting step 16 is performed by the winding diameter detecting unit 5, the winding diameter F comparing step 19, the winding diameter S comparing step 21, and the winding diameter T comparing step 26 are performed by the winding diameter comparing unit 8, the winding diameter change detecting steps 22 and 27 are performed by the winding diameter change detecting unit 12, the winding diameter change comparing step 31 is performed by the abnormal winding diameter change judging unit 15, the winding diameter change maximum value comparing step 23 and the winding diameter change maximum value storing step 24 are performed by the winding diameter change maximum value storing unit 13, the high reference speed setting step 25 is performed by the high reference speed calculating unit 6 and the reference speed setting unit 9, the low reference speed setting step 32 is performed by the low reference speed calculating unit 7 and the reference speed setting unit 9, and the speed controlling step 34 is performed by the speed controlling unit 10.

As described above, according to (Embodiment 3), based on the comparison results between a detected winding diameter and the winding diameter comparison reference values F, S, and T, the current tape position is detected and the operations for detecting a winding diameter and abnormality are controlled. As shown in FIG. 9, around the beginning of the tape where a detected winding diameter of the supply side reel 3 is larger than the winding diameter comparison reference value F serving as a first winding diameter comparison reference value (F<the winding diameter), the reference speed setting unit 9 sets the reference speed of the motor 1 at high speed to cause the magnetic recording tape to run at high speed. At this point, the winding diameter change detecting unit 12 is not operated according to the comparison results from the winding diameter comparing unit 8 or does not judge abnormality.

When the winding diameter is smaller than the first winding diameter comparison reference value F and is larger than the winding diameter comparison reference value S serving as a second reference winding diameter (S<the winding diameter<F), the tape is caused to run at high speed, the winding diameter change detecting unit 12 is operated according to the comparison results from the winding diameter comparing unit 8, and the winding diameter is outputted to the winding diameter change maximum value recording unit 13.

When the winding diameter is smaller than the second winding diameter comparison reference value S and is larger than the winding diameter comparison reference value T serving as a third winding diameter comparison reference value (T<the winding diameter<S), the abnormality detecting unit 101 performs an abnormality detecting operation according to the comparison results from the winding diameter comparing unit 8. To be specific, the winding diameter change detecting unit 12 outputs a change in winding diameter to the winding diameter change maximum value storage 13 and the abnormal winding diameter change judging unit 15, and the abnormality detecting operation is performed according to a change in winding diameter as in the case of (Embodiment 1).

When the winding diameter is smaller than the third winding diameter comparison reference value T (the winding diameter<T), the reference speed setting unit 9 shifts the tape speed to a low speed. At this point, the winding diameter change detecting unit 12 stops its operation according to the comparison results of the winding diameter comparing unit 8 and does not judge abnormality.

Namely, according to a winding diameter of the supply side reel 3, it is possible to distinguish a winding diameter region for detecting an abnormal change in winding diameter and a winding diameter region not performing detection. In the case where the winding diameter is still sufficiently large, when it is judged that the winding diameter detected by the winding diameter detecting unit 5 is erroneous detection, it is possible to prevent extension of fast forwarding/rewinding time, the extension being resulted from a tape running speed which is reduced afterward.

Further, a winding diameter region is provided which only detects a change in winding diameter and stores a winding diameter change maximum value, so that accuracy of detecting abnormality can be improved while preventing extension of the fast forwarding/rewinding time as described above. Accuracy of detecting abnormality can be increased because the number of detected changes in winding diameter is increased, the changes being required for detecting the winding diameter change maximum value, and variations in winding diameter change maximum value can be reduced. It is judged whether a winding diameter detected by the winding diameter detecting unit 5 is correct or not based on the winding diameter change maximum value.

Additionally, although the above embodiments discussed rewinding as an example, the similar operations are performed for fast forwarding as well. To be specific, in the case of fast forwarding, the tape can be quickly wound up from the supply reel to the take-up reel of the tape cassette. Thus, the supply reel of the tape cassette serves as the supply side reel 3 and the take-up reel of the tape cassette serves the take-up side reel 2.

In the above explanation, it is judged whether a winding diameter detected by the winding diameter detecting unit is correct or not based on the maximum winding diameter previously. Judgment may be performed based on other statistic values such as an average value of winding diameters previously.

As described above, according to the present invention, it is possible to perform judgment for a winding diameter which cannot be judged only by comparing a winding diameter detected by the winding diameter detecting unit and a winding diameter detected last time, and the following phenomenon can be prevented, a decelerating point cannot be detected, an approach is made to the end of the magnetic recording tape while high running speed is maintained, and thus the tape is damaged. Further, the excellent effect of shortening fast forwarding/rewinding can be provided.

What is claimed is:

1. A tape medium running device, for reducing a first winding speed to a second speed lower than said first speed as a function of a winding diameter of a magnetic recording tape wound around a reel, at a position near an end of such magnetic recording tape being wound from one reel to another reel at the first speed, the device comprising:

a motor;

a rotation detecting unit for detecting a signal of a frequency proportionate to a rotation speed of the motor;

a take-up reel which is wound with one end of such magnetic recording tape and rotates in synchronization with a rotation speed of the motor;

a supply reel which is wound with the other end of such magnetic recording tape;

a winding diameter detecting unit for detecting a winding diameter of such magnetic recording tape wound around the supply reel;

a reference high speed calculating unit for outputting a first reference speed for setting the rotation speed of the motor at the first speed;

a reference low speed calculating unit for outputting a second reference speed for setting the rotation speed of the motor at the second speed;

a winding diameter comparing unit for comparing an output from the winding diameter detecting unit and a winding diameter comparison reference value previously set in the winding diameter comparing unit;

an abnormality detecting unit for detecting abnormality based on an output from the winding diameter detecting unit;

a reference speed setting unit for outputting an output from the low reference speed calculating unit as a third reference speed when an output from the abnormality detecting unit indicates abnormality or when an output from the winding diameter detecting unit is detected to be smaller than the winding diameter comparison reference value, and outputting an output from the high reference speed calculating unit as a fourth reference speed in other cases;

a speed control unit for outputting a rotation instruction signal based on an output from the rotation detecting unit and an output from the reference speed setting unit, and a drive unit for rotating the motor in response to the rotation instruction signal, the abnormality detecting unit comprising:

a winding diameter change detecting unit for detecting a change in winding diameter on a basis of a winding diameter detected by the winding diameter detecting unit; and an abnormal winding diameter change judging unit for judging whether the winding diameter detected by the winding diameter detecting unit is correct or not on a basis of a winding diameter change comparison reference and a change in diameter detected by the winding diameter change detecting unit, and notifying the reference speed setting unit of an occurrence of abnormality.

2. The tape medium running device according to claim 1, further comprising a winding diameter change comparison reference optimizing unit for changing the winding diameter change comparison reference according to a winding diameter change maximum value detected by the winding diameter change detecting unit.

3. The tape medium running device according to claim 2, wherein instead of changing the winding diameter change comparison reference according to the winding diameter change maximum value, the winding diameter change comparison reference is changed according to a statistic value.

4. The tape medium running device according to claim 3, wherein said statistic value is an average value of previously detected winding diameters.

5. The tape medium running device according to claim 1, wherein the abnormality detecting unit and the reference speed setting unit are controlled by identifying a current tape position according to a plurality of winding diameter comparison reference values previously set in the reference speed setting unit and the winding diameter detected by the winding diameter detecting unit, and switching is performed, according to each tape position, among a section where the reference speed of the motor is set at the first speed without going through the abnormality detecting unit, a section where the reference speed of the motor is set at the first speed after a change in winding diameter is detected and only a maximum value of the change in winding diameter is stored, a section where a reference speed of the motor is set at the first speed or the second speed through the abnormality detecting unit, and a section where the reference speed of the motor is act at the second speed without going through the abnormality detecting unit, so that two different winding diameter regions are provided, one for detecting abnormality in the change in winding diameter and the other for not detecting the abnormality.

6. The tape medium running device according to claim 1, wherein the second speed of the reference low speed calculating unit is set as a reference speed permitting deceleration from the first speed with passage of time and a final stop at the end of the magnetic recording tape.

* * * * *